US009518609B2

(12) United States Patent
Akiyama et al.

(10) Patent No.: US 9,518,609 B2
(45) Date of Patent: Dec. 13, 2016

(54) WHEEL BEARING WITH SENSOR

(75) Inventors: Ayumi Akiyama, Iwata (JP); Toru Takahashi, Iwata (JP); Kentarou Nishikawa, Iwata (JP); Takayuki Norimatsu, Iwata (JP)

(73) Assignee: NTN CORPORATION, Osaka (JP)

( * ) Notice: Subject to any disclaimer, the term of this patent is extended or adjusted under 35 U.S.C. 154(b) by 843 days.

(21) Appl. No.: 13/821,772

(22) PCT Filed: Sep. 2, 2011

(86) PCT No.: PCT/JP2011/070030
§ 371 (c)(1),
(2), (4) Date: Mar. 8, 2013

(87) PCT Pub. No.: WO2012/033018
PCT Pub. Date: Mar. 15, 2012

(65) Prior Publication Data
US 2013/0177269 A1 Jul. 11, 2013

(30) Foreign Application Priority Data

Sep. 10, 2010 (JP) .................................. 2010-203311
Nov. 10, 2010 (JP) .................................. 2010-251413

(51) Int. Cl.
*F16C 19/00* (2006.01)
*F16C 41/00* (2006.01)
(Continued)

(52) U.S. Cl.
CPC ............. *F16C 41/00* (2013.01); *F16C 19/186* (2013.01); *F16C 19/522* (2013.01);
(Continued)

(58) Field of Classification Search
CPC ..... F16C 19/186; F16C 19/522; F16C 19/525; F16C 19/547; F16C 2326/02; F16C 19/18; F16C 19/50–19/54; G01L 5/0019
(Continued)

(56) References Cited

U.S. PATENT DOCUMENTS 7,043,999 B2    5/2006 Bernhard et al.
7,270,016 B2    9/2007 Sentoku et al.
(Continued)

FOREIGN PATENT DOCUMENTS

CN    1793676 A    6/2006
JP    6-13398      2/1994
(Continued)

OTHER PUBLICATIONS

Chinese Office Action mailed Mar. 26, 2014 in corresponding Chinese Application No. 201180043038.1.
(Continued)

*Primary Examiner* — John Breene
*Assistant Examiner* — Lynda Dinh

(57) ABSTRACT

A sensor equipped wheel support bearing assembly, in which a continuous estimated load can be obtained depending on various inputted load conditions is provided. The sensor equipped wheel support bearing assembly includes a sensor unit provided in a stationary member, and a load estimating unit. The load estimating unit includes a load estimation calculating section for calculating the load using an estimation calculating equation, an evaluation value calculation section for calculating an evaluation value, which provides a parameter switching index in the estimation calculating equation, from sensor output signals, and a parameter switching section for switching the parameter based on a comparison result of the evaluation value with a threshold value. The load estimation calculating section includes a
(Continued)

calculation correcting block for correcting the calculation result on both sides of the threshold value within a predetermined evaluation value region containing the threshold value.

10 Claims, 18 Drawing Sheets

(51) Int. Cl.
    *F16C 19/18*         (2006.01)
    *F16C 19/52*         (2006.01)
    *G01L 5/00*          (2006.01)

(52) U.S. Cl.
    CPC .......... *F16C 19/525* (2013.01); *G01L 5/0019* (2013.01); *F16C 2326/02* (2013.01)

(58) Field of Classification Search
    USPC ........................................................ 702/173
    See application file for complete search history.

(56) References Cited

U.S. PATENT DOCUMENTS

| | | | |
|---|---|---|---|
| 8,540,431 | B2 | 9/2013 | Nishikawa et al. |
| 8,567,260 | B2 | 10/2013 | Nishikawa et al. |
| 8,578,791 | B2 | 11/2013 | Ikki et al. |
| 2004/0244496 | A1 | 12/2004 | Bernhard et al. |
| 2006/0137471 | A1 | 6/2006 | Sentoku et al. |
| 2007/0156315 | A1 | 7/2007 | Raab et al. |
| 2010/0202718 | A1* | 8/2010 | Isobe .................... F16C 19/186 384/448 |
| 2011/0185823 | A1 | 8/2011 | Nishikawa et al. |
| 2011/0214513 | A1 | 9/2011 | Ikki et al. |
| 2012/0014632 | A1 | 1/2012 | Nishikawa et al. |

FOREIGN PATENT DOCUMENTS

| | | |
|---|---|---|
| JP | 2004-538564 | 12/2004 |
| JP | 2006-300086 | 11/2006 |
| JP | 2007-534534 | 11/2007 |
| JP | 2008-51669 | 3/2008 |
| JP | 2010-43901 | 2/2010 |
| JP | 2010-127376 | 6/2010 |
| JP | 2010-181154 | 8/2010 |
| WO | WO 01/77634 A2 | 10/2001 |
| WO | WO 2010/044228 A1 | 4/2010 |
| WO | WO 2010/055636 A1 | 5/2010 |
| WO | WO 2010/110173 A1 | 9/2010 |

OTHER PUBLICATIONS

Chinese Office Action dated Nov. 27, 2014 in corresponding Chinese Patent Application No. 201180043038.1.
Japanese Office Action mailed Mar. 4, 2014 in corresponding Japanese Application No. 2010-251413.
International Search Report mailed Dec. 6, 2011 for Corresponding PCT Application PCT/JP2011/070030.
International Preliminary Report on Patentability mailed Apr. 18, 2013 for corresponding International Application No. PCT/JP2011/070030.

* cited by examiner

Fig. 15
CHART (A)
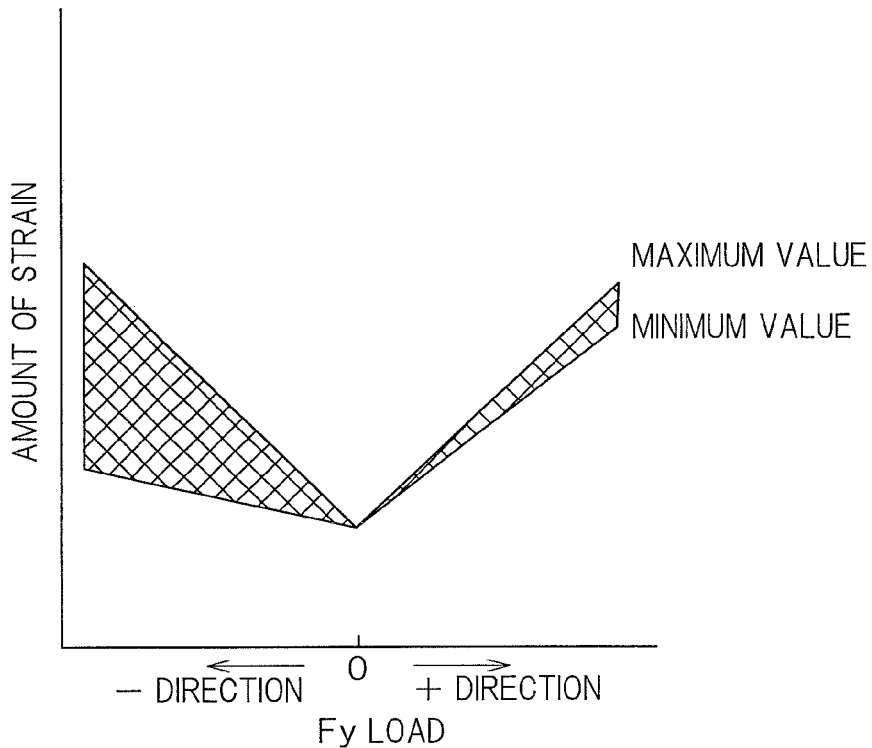
CHART (B)
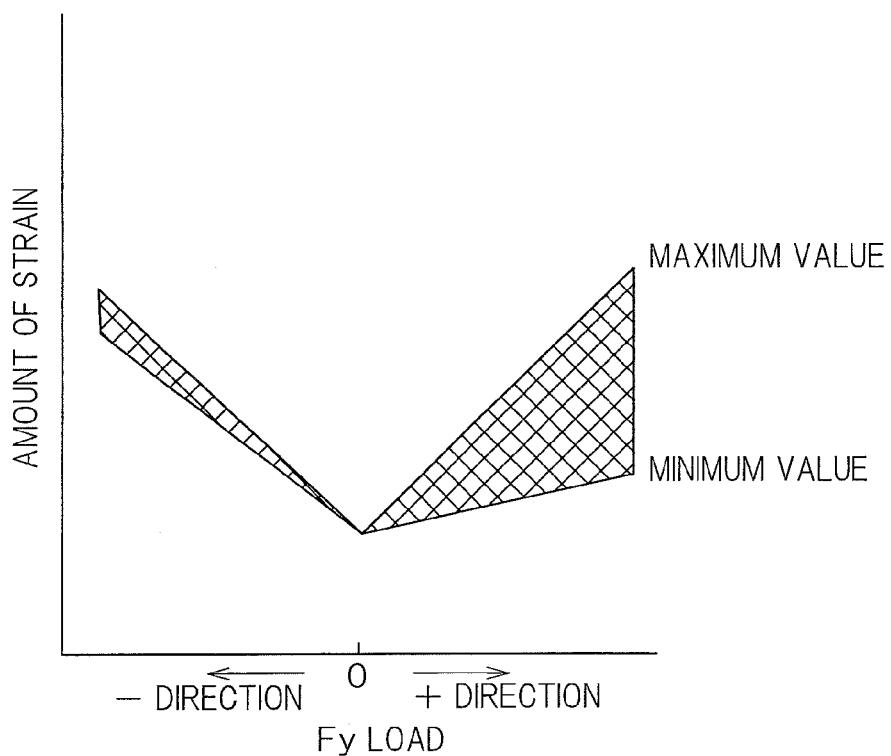

WHEEL BEARING WITH SENSOR

CROSS REFERENCE TO THE RELATED APPLICATION

This application is a U.S. national stage application of PCT/JP2011/070030 filed Sept. 2, 2011and claims the foreign priority benefit of Japanese Application No. 2010-203311 filed Sept. 10, 2010 and Japanese Application No 2010 -251413 filed Nov. 10, 2010, in the Japanese Intellectual Property Office, the contents of all of which are incorporated herein by reference.

BACKGROUND OF THE INVENTION

Field of the Invention

The present invention relates to a sensor equipped wheel support bearing assembly having a load detecting sensor built therein for detecting a load imposed on a bearing of a wheel.

Description of Related Art

As a technique to detect a load imposed on each of wheels of an automotive vehicle, such a wheel support bearing assembly has been made in which a strain gauge is pasted to an outer ring of the wheel support bearing assembly so that the load can be detected from a strain in an outer ring of an outer diametric surface. In this respect, see, for example, the patent document 1 listed below. It has, however, been found that the wheel support bearing assembly disclosed in the patent document 1 is incapable of detecting the load accurately since, when the load acting on the wheel support bearing assembly is to be detected, the amount of deformation of a stationary ring relative to the load is so small as to result in a small amount of strain and, therefore, the detecting density is lowered enough to fail to detect the load accurately.

In order to resolve the problems referred to above, such a sensor equipped wheel support bearing assembly, which is constructed as subsequently discussed, has been suggested. In this respect, see the patent document 2 also listed below. The sensor equipped wheel support bearing assembly disclosed therein includes an outer member having an inner periphery formed with double rows of raceway surfaces, an inner member having an outer periphery formed with raceway surfaces in face to face relation with the above described raceway surfaces in the outer member, and double rows of rolling elements intervened between the respective raceway surfaces of the outer and inner members that are held in face to face relation with each other, which assembly is used to rotatably support each of the wheels relative to a vehicle body structure. An outer diametric surface of a stationary member, which is one of the outer and inner members, is provided with at least one pair of a sensor unit pair comprised of two sensor units disposed at respective circumferential portions of the stationary member and spaced a 180° phase difference from each other in a circumferential direction thereof. Each of the sensor units referred to above includes a strain generating member, which has two or more contact fixing segments that are fixed to the outer diametric surface of the stationary member in contact therewith, and a sensor fitted to the strain generating member for detecting the strain induced in the strain generating member.

In the construction described above, on the basis of the difference between respective sensor output signals fed from the two sensor units in the sensor unit pair, a radially acting load acting on the wheel support bearing assembly in a radial direction is estimated by a radially acting load estimating unit. Also, on the basis of the sum of the sensor output signals of the two sensor units in the sensor unit pair, an axially acting load acting on the wheel support bearing assembly in an axial direction is estimated by an axially acting load estimating unit. The two sensor units of at least one pair of the sensor unit pairs are disposed at an upper surface area and a lower surface area of the outer diametric surface of the stationary member, which correspond respect to top and bottom positions, respectively, relative to a tire tread surface. On the basis of an output signal amplitude of the sensors of the sensor unit pairs, the direction of the above described axially acting load is determined by an axially acting load direction determining unit. The load estimating process in this case is shown in a schematic block diagram in FIG. 26 of the accompanying drawings attached to this specification.

If the contact fixing segments of the strain generating member in the sensor unit are disposed in the vicinity of the rolling surface of the stationary member, the sensor output signal accompanies a fluctuation proximate to the sinusoidal wave, as shown in FIG. 27, incident to rotation of the wheel. This means that a change in strain resulting from the passage of the rolling elements is detected. With the above described construction, since from the difference of amplitude values (vibration components resulting from a revolving movement of the rolling elements) in the sensor output signals of the two sensor units that are disposed respectively at the top and bottom positions, the axially acting load is determined and, in dependence on positive or negative of the axially acting load, the load is calculated with the use of a load estimating parameter appropriate thereto, the load can be estimated with a high sensitivity.

PRIOR ART DOCUMENT

[Patent Document]

[Patent Document 1] JP Laid-open Patent Publication No, 2003-530565

[Patent Document 2] JP Laid-open Patent Publication No. 2010-43901

[Patent Document 3] JP Laid-open Patent Publication No. 2010-181154

SUMMARY OF THE INVENTION

However, it has been found that in the case of the construction disclosed in the patent document 2 listed above, since an optimum load estimating parameter is selected, the amplitude value of the sensor output signal needs be calculated, and, therefore, it is incapacitated. In other words, under a condition in which the rotation is halted or under a condition in which the rotation is taking place at an extremely low speed, no signal change by the rolling element load results in or a very slow change results in. In such case, it is not possible to determine the magnitude of the amplitude from the change in sensor output signal.

On the other hand, as a device for detecting the amplitude value of the sensor output signal resulting from the rolling element load even under a stationary condition, such a device is available, in which a plurality of sensors are disposed within a region (circumferential length corresponding to a deployed pitch of the rolling elements) that is sufficient to observe an influence brought about by the rolling element load and a distribution of strains is then measured directly. It has, however, been found that since in this case the number of the sensors increases and a detecting circuit become complicated, problems arise in connection with the increase of costs and the securement of the reliability.

In view of the above, the inventors of the present invention have developed such a construction as a novel load estimating unit employed in the sensor equipped wheel support bearing assembly, which construction is shown in a block diagram in FIG. 28 of the accompanying drawings. In this respect, see the patent document 3 listed above. Here, the parameter A in FIG. 28 is intended to mean the average value of the two sensor outputs so disposed that rolling element signals may be spaced a 180° phase difference from each other. In this construction, as a load estimation calculating equation, a first calculating equation utilizing the average value A of the sensor output signals as a variable and a second calculating equation utilizing the average value A of the sensor output signals and an amplitude B thereof as variables are made readily available and a load calculating process is switched over depending on the speed of rotation. In other words, under a normal traveling condition, the load estimation and calculation are performed by the use of the second calculating equation utilizing the average value A of the sensor output signals and the amplitude value B, but under a low speed or halted condition, the load estimation and calculation are performed by the use of the first calculating equation utilizing only the average value A. In the case of the construction shown in FIG. 28, a rotational speed information is used in determining the rotational speed.

Where as is the case with the construction disclosed in the patent document 2 referred to above and the construction suggested by the inventors of the present invention in the patent document 3 referred to above, the construction is so made that in dependence on the condition of the detected sensor output signals or the condition of the load estimated, an optimum one of a plurality of load estimating parameters is selected and, when the construction is made to calculate the estimated load, a detection result having a small error in the non-linear characteristic of each of the sensors can be obtained.

It has, however, been found that in this case, if the load estimating parameter is selected in dependence on the plurality of the conditions, it will occurs that the estimated load value obtained as a result of the calculation may become discontinuous as a result of the switching of the parameters. Such a discontinuous change is undesirable in a control system used in, for example, an automotive vehicle of a kind in which based on the detected estimated load value various operations are executed.

In view of the foregoing, the present invention has for its primary object to provide a sensor equipped wheel support bearing assembly of a type, in which while a load estimation error is reduced by correcting the non-linearity of the sensor a continuous estimated load can be obtained in dependence on various inputted load conditions. In the description that follows, the summary of the present invention will be described by the aid of reference numerals employed in the accompanying drawings.

A sensor equipped wheel support bearing assembly in accordance with a first aspect of the present invention includes a wheel support bearing for rotatably supporting a vehicle wheel relative to a vehicle body structure, the bearing including an outer member 1 having an inner periphery formed with a plurality of rolling surfaces, an inner member 2 having an outer periphery formed with rolling surfaces that faces the respective rolling surfaces in the outer member, and a plurality of rows of rolling elements 5 interposed between the rolling surfaces in the outer member 1 and the rolling surfaces in the inner member 2; a plurality of load detecting sensor units 20 provided in one of the outer member 1 and the inner member 2, which serves as a stationary member, each of the sensor units 20 including a strain generating member 21, having two or more contact fixing segments 21a to be fixed to the stationary member in contact therewith, and one or more sensors 22, 22A, 22B fitted to the strain generating member 21 for detecting a strain occurring in the strain generating member 21; and a load estimating unit 30 for estimating a load acting on the vehicle wheel from an output signal of the sensor 22, 22A, 22B in each of the sensor units 20.

Further, the load estimating unit 30 referred to above includes a load estimation calculating section 35 for calculating the load acting on the wheel support bearing by applying the output of the sensor 22 in each of the sensor units 20 to a predetermined estimation calculating equation, an evaluation value calculation section 32 for calculating one or more evaluation values to be used as an index for switching a parameter in the estimation calculating equation, from the output signal of the sensor 22 in each of the sensor units 20, and a parameter switching section 34 for comparing the evaluation value Ei with a predetermined threshold value Ci to switch the parameter in the estimation calculating equation in dependence on a result of such comparison, and the load estimation calculating section 35 referred to above a calculation correcting block 35a for correcting a result of calculation by combining two load estimation results calculated by the estimation calculating equation with the use of the parameters within respective evaluation value regions on both sides of the threshold value Ci in the event that the evaluation value Ei is within a predetermined region containing the threshold value Ci.

According to the first aspect described above, in the load estimating unit 30 having the load calculating section 35 for calculating the load acting on the wheel support bearing by applying the sensor output signal of each of the sensor units 20 to the predetermined estimation calculating equation, one or more of the evaluation value Ei, which will become an index for switching a parameter in the estimation calculating equation, from the sensor output signal of each of the sensor units 20 is calculated by the evaluation value calculation section 32 and, also, by the parameter switching section 34, the evaluation value Ei is compared with the predetermined threshold value Ci and the parameter is then switched in dependence on the result of such comparison. Further, in the load estimation calculating section 35 referred to above, the calculation correcting block 35a corrects a result of calculation by combining two load estimation results calculated by the estimation calculating equation with the use of the parameter within an evaluation value region on both sides of the threshold value Ci in the event that the evaluation value Ei is within a predetermined region containing the threshold value Ci. For this reason, while the non-linear characteristic of the sensor 22 is corrected to reduce a load estimation error, a continuous estimated load can be obtained in dependence with various inputted load conditions.

In one embodiment of the present invention, the evaluation value Ei calculated by the evaluation value calculation section 32 may be indicative of a travelling speed of an automotive vehicle. In the case of this feature, by switching the parameter in the estimation calculating equation, which is used by the load estimation calculating section 35, to that appropriate to a rotational speed region, the load acting on the vehicle wheel can be estimated with a high reliability.

In another embodiment of the present invention, the evaluation value calculation section 32 referred to above may calculate, as the evaluation value Ei, the difference between amplitude values of respective output signals of the sensors 22 in the sensor units 20 which are provided at upper and lower surface areas of an outer diametric surface of the stationary member, which correspond to top and bottom positions relative to a tire tread surface. According to this feature, an accurate load estimation can be achieved in dependence on an up and down load.

In a further embodiment of the present invention, the evaluation value calculation section 32 referred to above may calculate, as the evaluation value Ei, the difference between amplitude values of respective output signals of the sensors 22 in the sensor units 20 which are provided at left and right surface areas of an outer diametric surface of the stationary member, which correspond to left and right positions relative to a tire tread surface. According to this feature, an accurate load estimation can be achieved in dependence on the load acting in a direction parallel to the direction of travel of the automotive vehicle.

In a still further embodiment of the present invention, the evaluation value calculation section 32 referred to above may calculate, as the evaluation value Ei, a combination of two or more evaluation values, such two or more evaluation values including an evaluation value indicative of a travelling speed of an automotive vehicle an evaluation value determined as the difference between amplitude values of respective output signals of the sensors 22 in the sensor units 20 which are provided respectively at upper and lower surface areas of an outer diametric surface of the stationary member, which upper and lower surface areas correspond respectively to top and bottom positions relative to a tire tread surface, and an evaluation value determined as the difference between amplitude values of respective output signals of the sensors 22 in the sensor units 20 which are provided at left and right surface areas of an outer diametric surface of the stationary member, which left and right surface areas correspond respectively to left and right positions relative to a tire tread surface. According to this feature, an accurate load estimation can be carried out that suits to the load acting in various directions.

In a yet further embodiment of the present invention, the predetermined region containing the threshold value Ci for the evaluation value Ei, with which the calculation correcting block 35a of the load estimation calculating section 35 corrects the result of calculation may be a region of a predetermined width m exceeding the threshold Ci and a region of a predetermined width m leading to the threshold value are summed together. By so doing with the regions, a stabilized correction can be easily accomplished by calculation.

In a yet further embodiment of the present invention, the correction of the calculation result, which the calculation correcting block 35a of the load estimation calculating section 35 performs by combining the two load estimation results together within the predetermined region containing the threshold value Ci of the evaluation value Ei may be for the purpose of determining a linear summation of the two load estimation results. According to this feature, an accurate load estimation can be accomplished with a simplified calculation.

In a yet further embodiment of the present invention, the correction of the calculation result, which the calculation correcting block 35a of the load estimation calculating section 35 performs by combining the two load estimation results together within the predetermined region containing the threshold value Ci of the evaluation value Ei may be that in which combination of the two load estimation results is performed with the use of a quadratic function or higher dimensional function. According to this feature, further accurate load estimation can be performed.

In a still further embodiment of the present invention, the sensor units 20 referred to above may be provided in three or more, in which case the load estimating unit 30 is operable to estimate loads in three directions, including two radially acting loads acting in a vertical direction and a bilateral direction, which loads acts on the wheel support bearing, and an axially acting load acting in an axial direction, from output signals of the sensors 22 of the three or more sensor units 20. By so constructing, the load acting in various direction can be estimated.

In a still further embodiment of the present invention, the sensor unit 20 referred to above may be disposed at upper, lower, right and left surface areas of the outer diametric surface of the stationary member, which correspond respectively to top, bottom, right surface and left surface locations relative to a tire tread surface, in 90° phase difference relative to each other and, also, in equidistantly spaced relation to each other. When the four sensor units 20 are so disposed, the vertically acting load Fz acting on the wheel support bearing, the load Fx which will become a driving force or a braking force, and the axially acting load Fy can be further accurately estimated.

In a still further embodiment of the present invention, the load estimating unit 30 referred to above may include a direction determining section 33 for determining the direction of the axially acting load by utilizing the difference between amplitude values of the respective output signals of sensors 22 of two sensor units 20 disposed at top and bottom positions in face to face relation to each other, in which case in which case the parameter switching section 34 includes a direction correspondent command block 34a for switching the parameter of the estimation calculating equation in the load estimation calculating unit 35 in dependence on the result of determination performed by the direction determining section 33. According to this construction, the load estimation excellent in accuracy can be accomplished in dependence on the direction of the axially acting load acting on the wheel support bearing.

In a still further embodiment of the present invention, the load estimating unit 30 referred to above may include a preprocessing section 31 for calculating the average value and the amplitude value of the output signal of each of the sensors in each of the sensor units within a predetermined length of time, in which case the estimation calculating equation in the load estimation calculating section 35 calculates and processes the load with the use of one of only the average value, the amplitude value or with the use of both of the average value and the amplitude value.

In a still further embodiment of the present invention, the sensor unit 20 referred to above may include three or more contact fixing segments 21a and two sensors 22, the sensors 22 being fitted between the neighboring first and second contact fixing segments 21a and between the neighboring second and third contact fixing segments 21a, in which case the distance of spacing between the neighboring contact fixing segments 21a or the neighboring sensors 22 in a direction circumferentially of the stationary member is chosen to be [½+n] times (wherein n represents an integer) of a pitch of arrangement of the rolling elements 5 and the load estimating unit 30 makes use of the sum of the output signals of the two sensors 22 as the average value. In the case of this construction, the respective output signals of the two sensors 22 come to have the 180° phase difference and the average value thereof represents a value from which a component of fluctuation brought about by the passage of the rolling elements has been cancelled. Also, the amplitude value will become further accurate with influences of tempera and of the slippage between the knuckle and the flange having been eliminated assuredly.

In a still further embodiment of the present invention, each of the sensor units 20 referred to above may be provided with a temperature sensor 36, in which case the output signal of each of the sensors 22 in each of the sensor units 20 is corrected on the basis of an output signal of this temperature sensor 36. The use of the temperature sensor is effective to correct a temperature dependent drift of the sensor output signal of the sensor unit 20 and, therefore, the load estimation can be still further accurately.

The present invention in accordance with a second aspect thereof also provides a sensor equipped wheel support bearing assembly which includes a wheel support bearing for rotatably supporting a vehicle wheel relative to a vehicle body structure, the bearing including an outer member 1 having an inner periphery formed with a plurality of rolling surfaces, an inner member 2 having an outer periphery formed with rolling surfaces that faces the respective rolling surfaces in the outer member, and a plurality of rows of rolling elements 5 interposed between the rolling surfaces in the outer member and the rolling surfaces in the inner member; a plurality of load detecting sensor units 20 provided in one of the outer member 1 and the inner member 2, which serves as a stationary member, each of the sensor units 20 including a strain generating member 21, having two or more contact fixing segments 21a adapted to be fixed to the stationary member in contact therewith, and one or more sensors 22, 22A, 22B fitted to the strain generating member 21 for detecting a strain occurring in the strain generating member 21; and a load estimating unit 30 for estimating a load acting on the vehicle wheel from an output signal of the sensor 22, 22A, 22B in each of the sensor units 20.

The load estimating unit 30 referred to above includes a load estimation calculating section 35 for calculating the load acting on the wheel support bearing by applying the output of the sensor 22 in each of the sensor units 20 to a predetermined estimation calculating equation, an evaluation value output section 32 for outputting one or more evaluation values, which will become an index for switching a parameter in the estimation calculating equation, and a parameter switching section 34 for comparing the evaluation value Ei with a predetermined threshold value Ci to switch the parameter in the estimation calculating equation in dependence on a result of such comparison, the threshold value having a hysteresis set thereto.

According to the second aspect of the present invention described above, in the load estimating unit 30 having the load calculating section 35 for calculating the load acting on the wheel support bearing by applying the sensor output signal of each of the sensor units 20 to the predetermined estimation calculating equation, one or more of the evaluation value Ei, which will become an index for switching a parameter in the estimation calculating equation, is calculated by the evaluation value calculation section 32 and, also, by the parameter switching section 34, the evaluation value Ei is compared with the predetermined threshold value Ci and the parameter is then switched in dependence on the result of such comparison. In particular, since the hysteresis is set to the threshold value Ci, a frequent switching of the parameter within the boundary region of the parameter switching will not occur and the discontinuity of the estimated load value can be suppressed and, therefore, while the non-linear characteristic of the sensor is corrected to reduce the load estimation error, the continuous estimated load value can be obtained in dependence on the various inputted load conditions. Also, since the condition in which the estimated load value becomes discontinuous will hardly occur, it can be suited to a control system in which various operations are executed on the basis of the estimated load value.

In one embodiment according to the second aspect, the evaluation value calculated by the evaluation value output section 32 referred to above may be a signal indicative of a travelling speed of an automotive vehicle. In this case, by switching the parameter in the estimation calculating equation, that is used in the load estimation calculating section 35, to that depending on the rotational speed region of the vehicle wheel, the load acting on the vehicle wheel can be estimated with a good reliability.

In another embodiment of the present invention according to the second aspect thereof, the evaluation value outputted by the evaluation value output section 32 referred to above may be a steering angle. In this case, by switching the parameter in the estimation calculating equation, that is used in the load estimation calculating section 35, to that depending on the steering angle, the load acting on the vehicle wheel can be estimated with a good reliability.

In a further embodiment of the present invention according to the second aspect thereof, the evaluation value outputted by the evaluation value output section 32 referred to above may be a wheel-turning angle signal. In this case, by switching the parameter in the estimation calculating equation, that is used in the load estimation calculating section 35, to that depending on the wheel-turning angle signal, the load acting on the vehicle wheel can be estimated with a good reliability.

In a still further embodiment of the present invention according to the second aspect thereof, the evaluation value output section 32 referred to above may output, as the evaluation value Ei, the difference between amplitude values of respective output signals of the sensors 22 in the sensor units 20 which are provided at upper and lower surface areas of an outer diametric surface of the stationary member, which correspond to top and bottom positions relative to a tire tread surface.

In a yet further embodiment of the present invention according to the second aspect thereof, the evaluation value output section 32 referred to above may output, as the evaluation value Ei, the difference between amplitude values of respective output signals of the sensors 22 in the sensor units 20 which are provided at left and right surface areas of an outer diametric surface of the stationary member, which correspond to left and right positions relative to a tire tread surface.

In a yet further embodiment of the present invention according to the second aspect thereof, the evaluation value calculation section 32 referred to above may calculate, as the evaluation value Ei, the sum of respective amplitude values of the output signals of the sensors 22 in the sensor units 20 which are provided at upper, lower, left and right surface area of an outer diametric surface of the stationary member that correspond respectively to top, bottom left and right positions relative to a tire tread surface.

In a yet further embodiment of the present invention according to the second aspect thereof, the evaluation value calculation section 32 may calculate, as the evaluation value Ei, a combination of two or more evaluation values, such two or more evaluation values including two or more of an evaluation value descriptive of a vehicle travelling speed, an evaluation value descriptive of a steering angle, an evaluation value indicative of a wheel-turning angle signal, an evaluation value determined as the difference between amplitude values of respective output signals of the sensors 22 in the sensor units 20 which are provided respectively at upper and lower surface areas of an outer diametric surface of the stationary member, which upper and lower surface areas correspond respectively to top and bottom positions relative to a tire tread surface, and an evaluation value determined as the difference between amplitude values of respective output signals of the sensors 22 in the sensor units 20 which are provided at left and right surface areas of an outer diametric surface of the stationary member, which left and right surface areas correspond respectively to left and right positions relative to a tire tread surface.

In a yet further embodiment of the present invention according to the second aspect thereof, the hysteresis set to the threshold value Ci may have a magnitude adjustable by the parameter.

In a yet further embodiment of the present invention according to the second aspect thereof, the sensor units 20 may be provided in three or more, in which case the load estimating unit 30 referred to above is operable to estimate the loads, acting on the wheel support bearing in three directions, from output signals of sensors 22 of three or more sensor units 20, those loads acting in the three direction including two radially acting loads, acting in vertical and bilateral directions, and an axially acting load acting in an axial direction.

In a yet further embodiment of the present invention according to the second aspect thereof, the sensor unit 20 may be disposed at upper, lower, right and left surface areas of an outer diametric surface of the stationary member, which correspond respectively to top, bottom, right surface and left surface locations relative to a tire tread surface, in 90° phase difference relative to each other and, also, in equidistantly spaced relation to each other. If the four sensor units 20 are disposed in this way, the vertically acting load Fz acting on the wheel support bearing, the load Fx which will become a driving force or a braking force, and the axially acting load Fy can be estimated with a good accuracy.

In a yet further embodiment of the present invention according to the second aspect thereof, the load estimating unit 30 referred to above may include a preprocessing section 31 for calculating the average value and the amplitude value of the output signal of each of the sensors 22 in each of the sensor units 20 within a predetermined length of time, in which case the estimation calculating equation in the load estimation calculating section 35 calculates and processes the load with the use of one of only the average value, the amplitude value or both of the average value and the amplitude value.

In a yet further embodiment of the present invention according to the second aspect thereof, the sensor unit 20 referred to above may include three or more contact fixing segments 21a and two sensors 22, the sensors 22 being fitted between the neighboring first and second contact fixing segments 21a and between the neighboring second and third contact fixing segments 21a, in which case the distance of spacing between the neighboring contact fixing segments 21a or the neighboring sensors 22 in a direction circumferentially of the stationary member is chosen to be [½+n] times (wherein n represents an integer) of a pitch of arrangement of the rolling elements 5 and the load estimating unit 30 makes use of the sum of the output signals of the two sensors 22 as the average value. In this case, the respective output signals of the two sensors 22 come to have a about 180° phase difference and the average value thereof will be that from which a component of change caused by the passage of the rolling elements has been cancelled. Also, the amplitude value will become accurate with the influence of temperature and/or the influence of a slippage between the knuckle and the flange having been eliminated assuredly.

In a yet further embodiment of the present invention according to the second aspect thereof, each of the sensor units 20 may be provided with a temperature sensor 36 so that the output signal of each of the sensors 22 in each of the sensor units 20 can be corrected on the basis of an output signal of this temperature sensor.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 15 includes Chart (A) showing the relation between the amplitude of a sensor output signal at a top portion of an outer diametric surface of an outer member and the direction of an axially acting load and Chart (B) showing the relation between the amplitude of the sensor output signal at a lower surface portion of the outer diametric surface thereof and the axially acting load;

DESCRIPTION OF EMBODIMENTS

A first embodiment of the present invention will be described in detail with particular reference to FIGS. 1 to 16. This first embodiment is applied to a third generation model of the wheel support bearing assembly of an inner ring rotating type, which is used for rotatably supporting a drive wheel. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

Figure 1:
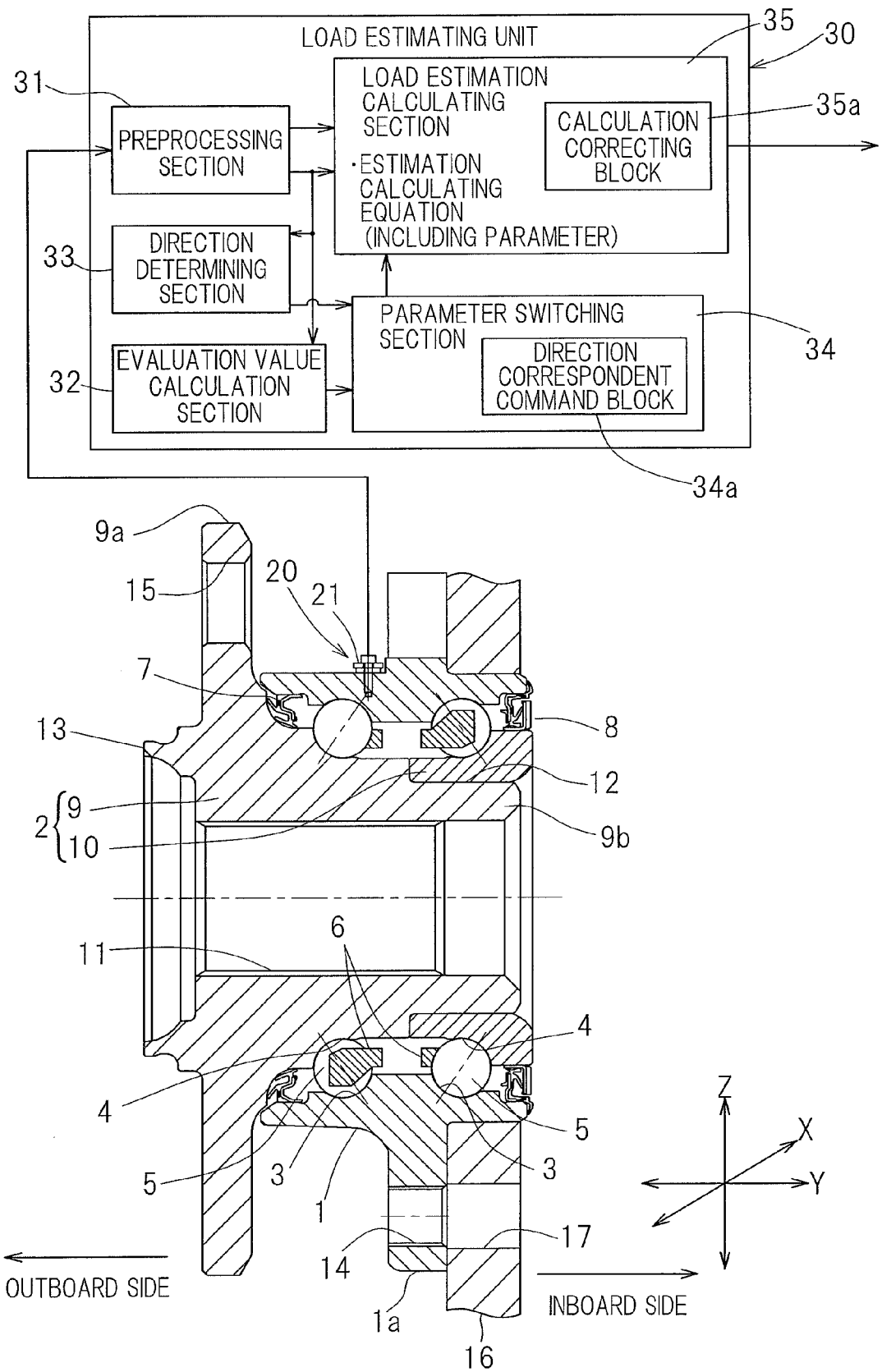
FIG. 1 is a diagram showing a combination of a longitudinal sectional view of a sensor equipped wheel support bearing assembly and a block diagram showing a conceptual construction of a detecting system thereof, designed in accordance with a first embodiment of the present invention.

A bearing in this sensor equipped wheel support bearing assembly includes, as best shown in FIG. 1 in a longitudinal sectional view thereof, an outer member 1 having an inner periphery formed with double rows of rolling surfaces 3, an inner member 2 having an outer periphery formed with rolling surfaces 4 in face to face relation with the respective rolling surfaces 3 in the outer member 1, and double rows of rolling elements 5 interposed respectively between the rolling surfaces 3 in the outer member 1 and the rolling surfaces 4 in the inner member 2. This wheel support bearing assembly is rendered to be a double row angular contact ball bearing type, in which the rolling elements 5 are in the form of balls and the double rows of the balls are retained by respective ball retainers 6. The rolling surfaces 3 and 4 in the outer and inner members 1 and 2 are each of a round sectioned shape and are so formed that the ball contact angles may be held in back-to-back relation to each other. A bearing space delimited between the outer and inner members 2, positioned one inside the other, has its opposite open ends sealed by respective sealing members 7 and 8.

The outer member 1 serves as a stationary member and is of one piece construction including a vehicle body fitting flange 1a that is formed on the outer periphery of the outer member 1 so as to extend radially outwards and is to be fitted to a knuckle 16 forming a part of a vehicle suspension system (not shown). The vehicle body fitting flange 1a is formed with a plurality of internally threaded holes 14 for knuckle fitting purpose defined therein at a corresponding number of circumferential portions thereof and, when knuckle bolts (not shown) each inserted into a corresponding bolt insertion hole 17 of the knuckle 16 from the inboard side are successively threaded into the internally threaded holes 14 referred to above, the vehicle body fitting flange 1a is secured to the knuckle 16.

The inner member 2 serves as a rotating member and is made up of a hub axle 9 having a wheel mounting hub flange 9a, formed integrally therewith so as to extend radially outwardly from an axle portion 9b, and an inner ring segment 10 mounted on an outer periphery of an inboard side end of the axle portion 9b of the hub axle 9. The double rows of the rolling surfaces 4, previously described as formed in the outer periphery of the inner ring 2, are defined in the hub axle 9 and the inner ring segment 10, respectively. An inner ring mounting surface area 12 is defined in an inboard side end of the hub axle 9 so as to be radially inwardly recessed to have a reduced diameter and the inner ring 10 referred to above is mounted on this inner ring mounting surface area 12. The hub axle 9 has a center portion formed with a bore 11 defined therein so as to extend axially over the entire length thereof The hub flange 9a referred to previously is provided with a press fitting hole 15 defined at a plurality of circumferential locations thereof for the passage of corresponding hub bolts (not shown). At a portion of the hub flange 9a of the hub axle 9 in the vicinity of the root portion thereof, a cylindrical pilot portion 13 for guiding a vehicle wheel and brake component parts (not shown) is formed so as to protrude in a direction towards the outboard side.

Figure 2:
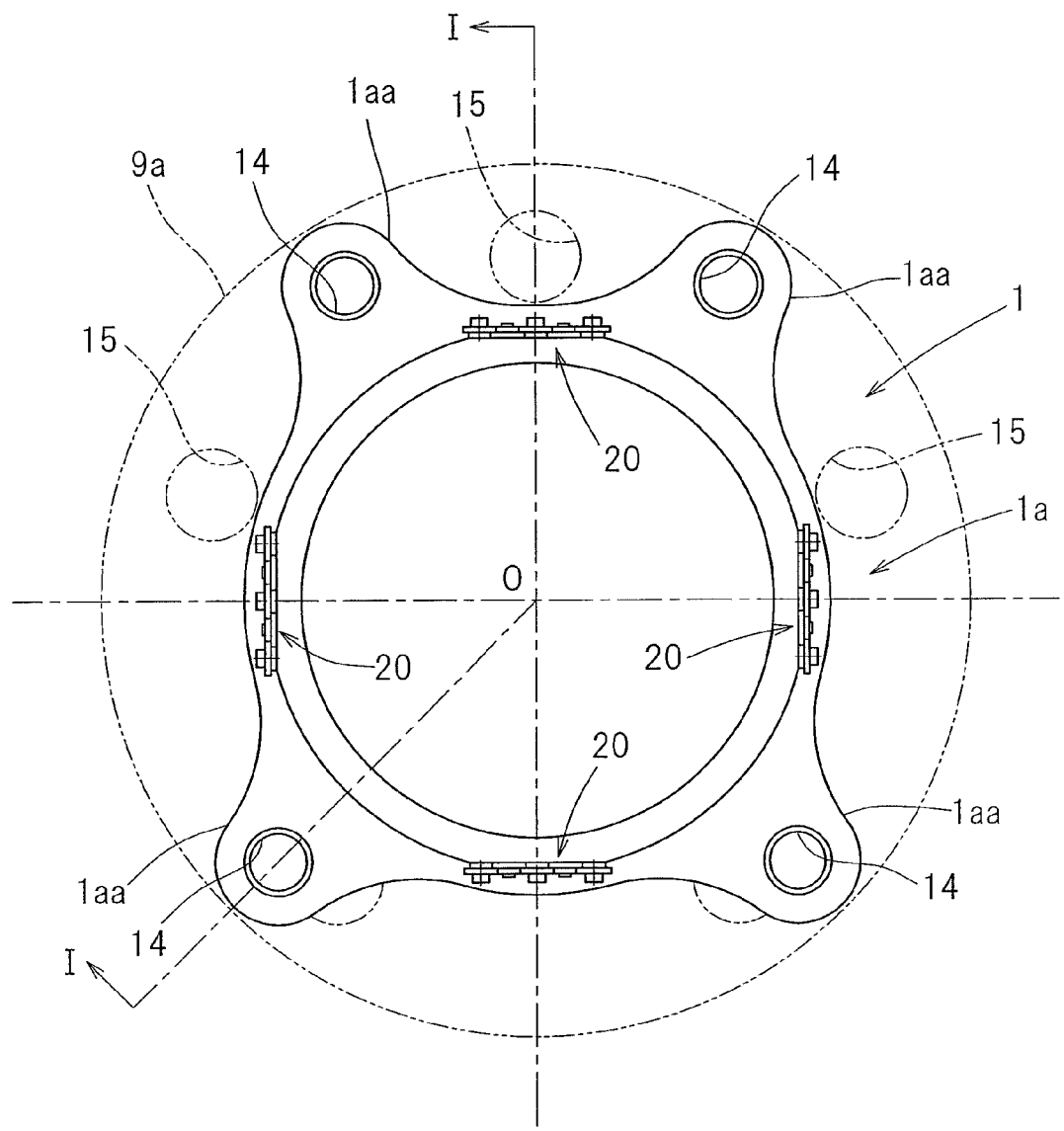
FIG. 2 is a front elevational view of an outer member of the sensor equipped wheel support bearing assembly as viewed from an outboard side.

FIG. 2 illustrates a front elevational view of the outer member 1 of the wheel support bearing assembly as viewed from the outboard side. It is to be noted that FIG. 1 illustrates a cross sectional view taken along the line I-I in FIG. 2. The vehicle body fitting flange 1a referred to previously is so designed and so shaped that the circumferential portions thereof, where the internally threaded holes 14 are defined as described previously, are in the form of projections 1aa protruding radially outwardly beyond the remaining portion of the vehicle body fitting flange 1a.

The outer member 1 serving as the stationary member has an outer diametric surface provided with four sensor units 20. In the instance now under discussion, those sensor units 20 are provided at an upper surface area, a lower surface area, a right surface area and a left surface area of the outer diametric surface of the outer member 1, which correspond respectively to a top position, a bottom position, a forward position and a rearward position with respect to a tire tread surface.

Figure 3:
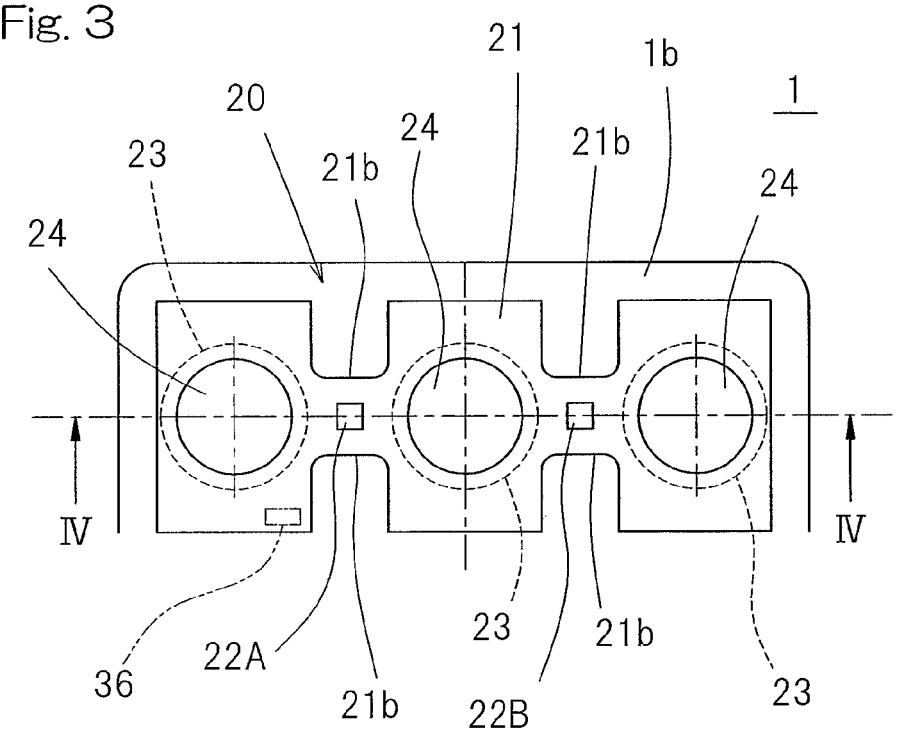
FIG. 3 is an enlarged plan view of a sensor unit employed in the sensor equipped wheel support bearing assembly.
Figure 4:
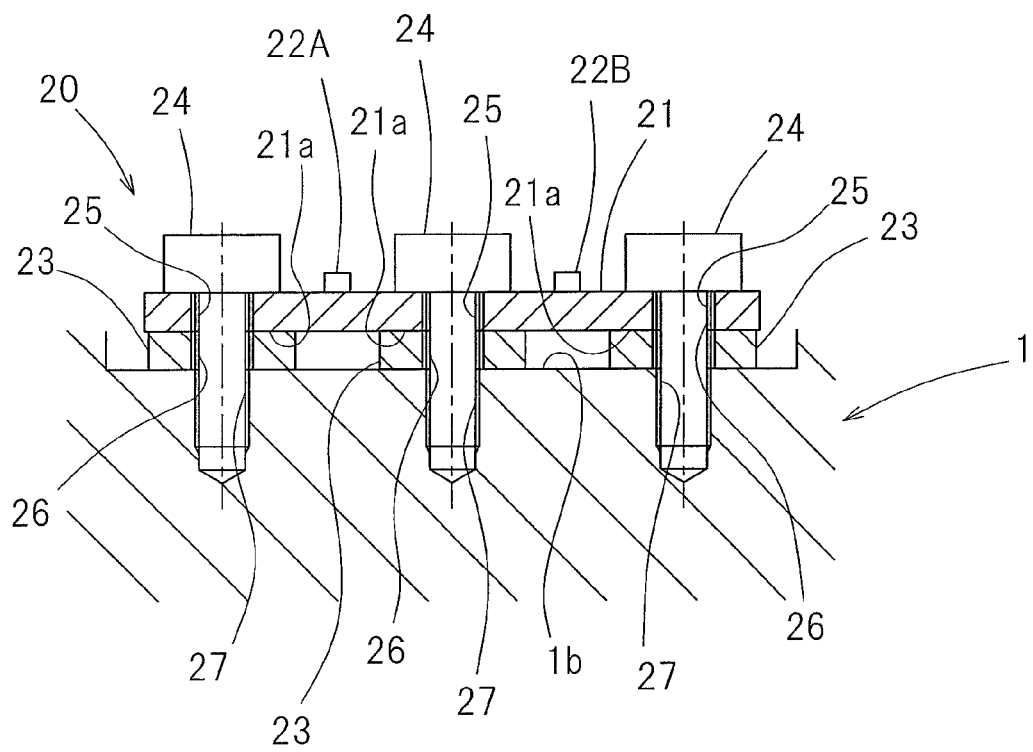
FIG. 4 is a cross sectional view taken along the line IV-IV in FIG. 3.

Each of those sensor units 20 includes, as best shown in FIGS. 3 and 4 in an enlarged plan view and an enlarged longitudinal sectional view, respectively, a strain generating member 21 and two strain sensors 22A and 22B fitted to the strain generating member 21 for detecting a strain induced in the strain generating member 21. The strain generating member 21 is in the form of a thin, elastically deformable plate member, made of a metallic material such as, for example, steel and having a thickness not greater than 2 mm, representing a band shape of a uniform width over the entire length thereof when viewed in a plan view, and has its opposite side portions formed with cutout portions 21b. Each of those cutout portions 21b has corner areas that are rendered to be an arcuate sectional shape. Also, the strain generating member 21 has three contact fixing segments 21a that are fixed to the outer diametric surface of the outer member 1 through spacers 23 in contact therewith. Those three contact fixing segments 21a are arranged in a row in a direction lengthwise of the strain generating member 21. Those two strain sensors 22A and 22B are fitted to respective portions of the strain generating member 21 where large strain may be induced relative to a load acting on the strain generating member 21 in various directions.

More specifically, each of the strain sensors 22A and 22B is disposed on an outer surface side of the strain generating member 21 and between the neighboring contact fixing segments 21a. In other words, referring to FIG. 4, one of the strain sensors, that is, the strain sensor 21A is disposed between the left contact fixing segment 21a and the intermediate contact fixing segment 21a and the other of the strain sensors, that is, the strain sensor 21B is disposed between the intermediate contact fixing area 21a and the right contact fixing segment 21a. The cutout portions 21b referred to above are, as shown in FIG. 3, provided respectively at two locations of the opposite side portions of the strain generating member 21, which align with sites of installation of the strain sensors 22A and 22B. Accordingly, the strain sensors 22A and 22B detect strains acting in a lengthwise direction of the strain generating member 21 in the vicinity of the cutout portions 21b. It is to be noted that the strain generating member 21 is preferably of a kind which does not undergo a plastic deformation even under a condition in which an expected maximum force as an external force acting on the outer member 1 serving as the stationary member or a working force acting between a tire and a road surface is applied. If the plastic deformation occurs, any deformation occurring in the outer member 1 will not be transmitted to the sensor units 20 and the measurement of the strain will be adversely affected.

As best shown in FIG. 4, each of the sensor units 20 is so disposed that the three contact fixing segments 21a of the corresponding strain generating member 21 may occupy respective positions that are the same with respect to the axial direction of the outer member 1 with the contact fixing segments 21a spaced from each other in a circumferential direction, and those contact fixing segments 21a are fixed to the outer diametric surface of the outer member 1 through associated spacers 23 by means of bolts 24. Each of the bolts 24 is inserted through a corresponding bolt insertion hole 26, defined in the associated spacer 23, by way of a bolt insertion hole 25, that is defined in each of the contact fixing segments 21a so as to extend radially across the thickness of the strain generating member 21, and is then firmly threaded into an internally threaded bolt hole 27 formed in an outer peripheral portion of the outer member 1. Thus, when the contact fixing segments 21a are fixed to the outer diametric surface of the outer member 1 with the spacers 23 intervening between them and the outer diametric surface of the outer member 1, various portions of the strain generating member 21 of a thin plate shape, where the cutout portions 21b are formed, can be kept apart from the outer diametric surface of the outer member 1 and, therefore, strain induced deformation of the neighborhood of each of the cutout portions 21b can be facilitated.

As axial positions where the contact fixing segments 21a are disposed as hereinabove described, an axial position which will be the neighborhood of the outboard row of the rolling surface 3 in the outer member 1 is selected. The neighborhood of the outboard row of the rolling surface 3 referred to above means a region ranging from a middle point between the inboard and outboard side rows of the rolling surfaces 3 to a site where the outboard side row of the rolling surface 3 is formed. To facilitate an installation of each of the sensor units 20 stably onto the outer diametric surface of the outer member 1, each of sites of the outer diametric surface of the outer member 1, where the respective spacers 23 are fixed in contact therewith, is formed with a flat surface area 1b.

Figure 5:
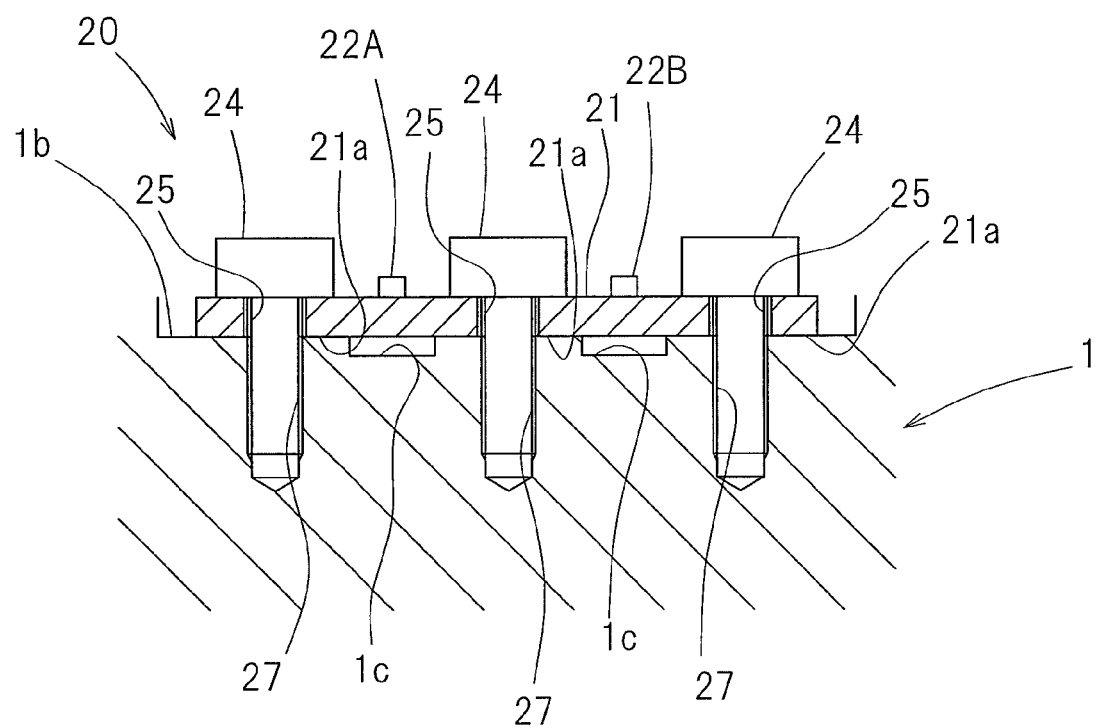
FIG. 5 is an enlarged longitudinal sectional view showing another example of installation of the sensor unit.

Other than that, it is to be noted that if a groove 1c is formed in a portion of the outer diametric surface of the outer member 1 that lies between the neighboring contact fixing segments 21a of the strain generating member 21 as shown in FIG. 5 in an enlarged longitudinal sectional view, the use of the spacers 23 can be dispensed with, and, even in this case, the various portions of the strain generating member 21, where the cutout portions 21b are positioned, can be spaced from the outer diametric surface of the outer member 1.

For each of the strain sensors 22A and 22B, any of various types may be employed. For example, each of the strain sensors 22A and 22B may be in the form of a metal foil strain gauge. In such case, it can be generally fixed to the strain generating member 21 by means of an adhesive medium. Also, each of the strain sensors 22A and 22B may be formed as a thick film resistance element on the strain generating member 21.

As shown in FIG. 1, the strain sensors 22A and 22B are connected with a load estimating unit 30 for estimating a load acting on the vehicle wheel from the output signals of the strain sensors 22A and 22B. In the instance now under discussion, an axially acting load Fy acting on the vehicle wheel in the axial direction, a vertically acting load Fz acting in a vertical direction, and a load Fx acting in an anteroposterior direction, which will become a driving force or a braking force, are estimated. This load estimating unit 30 includes a preprocessing section 31, an evaluation value calculation section 32, an Fy direction determining section 33, a parameter switching section 34 and a load estimation calculating section 35.

Figure 14:
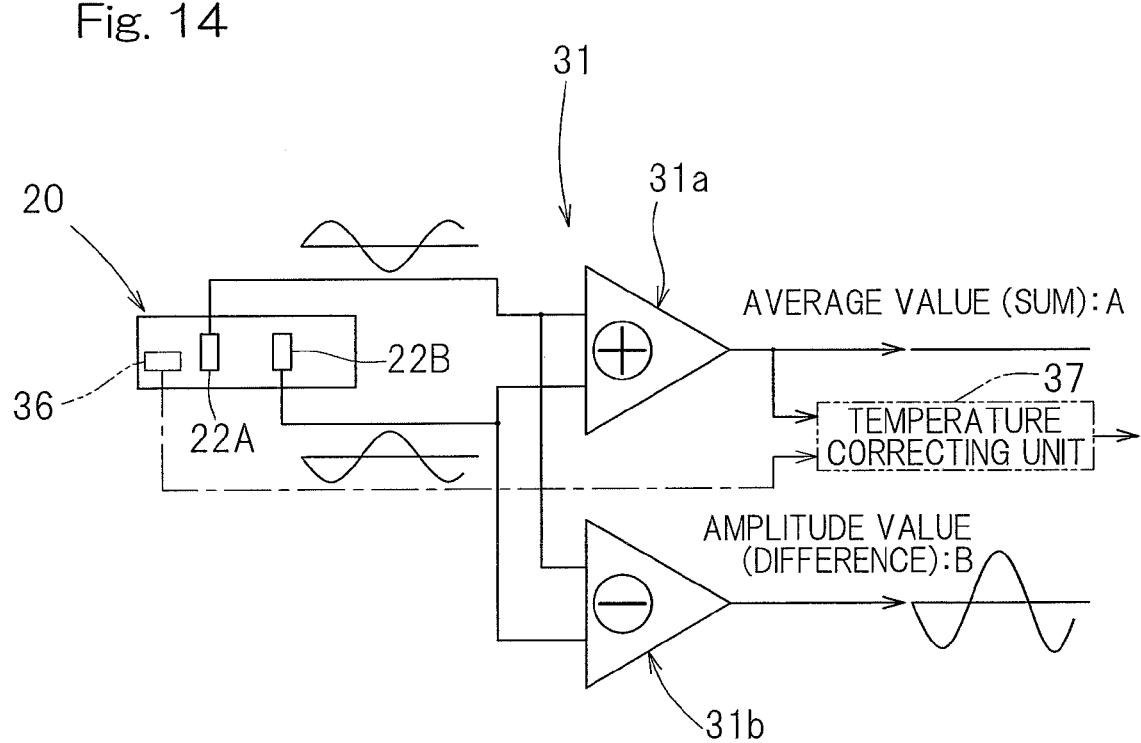
FIG. 14 is a block diagram showing one example of a construction of a preprocessing section employed in a load estimating unit.

In the preprocessing section 31, from the respective output signals of the two strain sensors 22A and 22B in the sensor unit 20, the average value A thereof and the amplitude value B thereof are calculated. Specifically, the preprocessing section 31 is, as shown in FIG. 14, comprised of an average value calculating block 31a in the form of an adder and an amplitude calculating block 31b in the form of a subtractor, and in the average calculating block 30a the sum of the respective output signals of the two strain sensors 22A and 22B are calculated and the sum thereof is drawn as the average value. In the amplitude calculating block 31b, the difference between the respective output signals of the two strain sensors 22A and 22B is calculated and the difference value is drawn as the amplitude value B.

Figure 6:
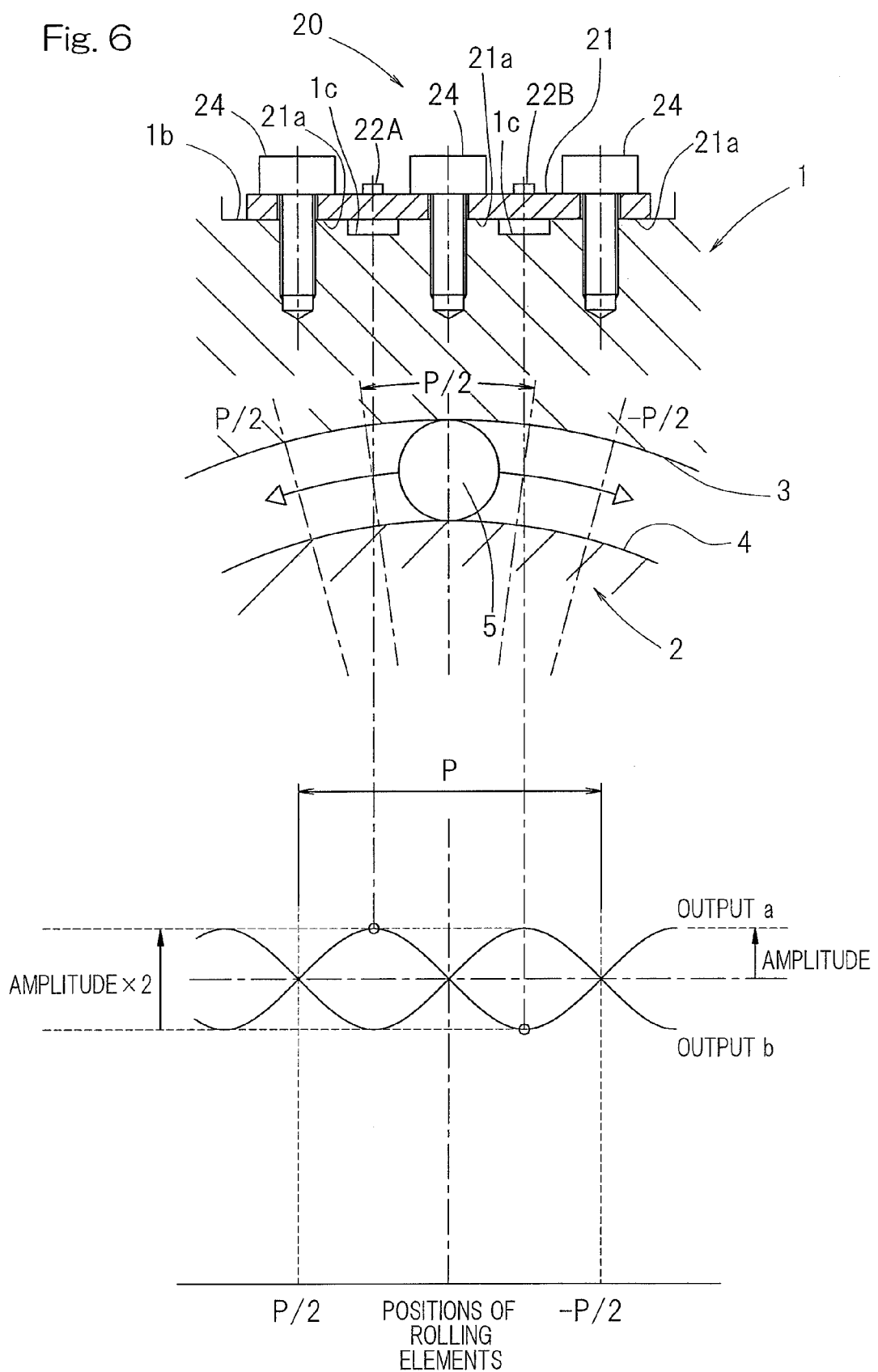
FIG. 6 is an explanatory diagram used to explain an influence brought about by a rolling element position on an output signal of the sensor unit.

Since the sensor unit 20 is provided at the axial position in the neighborhood of the outboard side row of the rolling surface 3 in the outer member 1, the respective output signals a and b of the strain sensors 22A and 22B are affected by the rolling elements 5 passing in the vicinity of the site of installation of the sensor unit 20 as shown in FIG. 6. Also, even during the halt of the bearing, the respective output signals a and b of the strain sensors 22A and 22B are affected by the position of the rolling elements 5. In other words, when the rolling elements 5 move past the position closest to the strain sensors 22A and 22B in the sensor unit 20 (or when the rolling elements 5 stay at that position), the respective output signals a and b of the strain sensors 22A and 22B attain the maximum values and, as the rolling elements 5 move away from that position (or when the rolling elements 5 stay at a position away from that position), the respective output signals a and b of the strain sensors 22A and 22B decrease. Since during the rotation of the bearing, the rolling elements 5 successively pass the neighborhood of the site of installation of the sensor unit 20 over a distance equal to a predetermined pitch of arrangement thereof, the respective output signals a and b of the strain sensors 22A and 22B assume respective waveforms each proximate to the shape of a cyclically changing sinusoidal wave shown by the solid line in FIG. 6 at a cycle of the pitch P of arrangement of the rolling elements 5. Also, the respective output signals a and b of the strain sensors 22A and 22B are apt to be affected by the hysteresis because of an influence brought about by temperature and/or a slippage taking place between the knuckle 16 and a surface of the vehicle body fitting flange 1a shown in FIG. 1.

In the embodiment now under discussion, in the preprocessing section 31 best shown in FIG. 1, with the sum of respective amplitudes of the output signals a and b of the two strain sensors 22A and 22B in each of the sensor units 20 taken as the above described average value A, the difference (absolute value) in amplitude, that is, |a-b| is averaged based on time to determine the previously described amplitude value B. By so doing, the average value A represents the value from which a component of change, brought by the passage of the rolling elements 5, has been cancelled. Also, the amplitude value B represents the value in which influences brought about by temperature and/or the slippage taking place between the knuckle and the flange, which appear in the output signals a and b of the two strain sensors 22A and 22B have been counterbalanced. Accordingly, using this average value A and this amplitude value B, it is possible to accurately detect the load acting on the wheel support bearing assembly and the tire tread surface.

Referring to FIG. 6, the distance of spacing between two of the three contact fixing segments 21a lined in the circumferential direction of the outer diametric surface of the outer member 1 serving as the stationary member, which are positioned on respective sides of the intermediate contact fixing segment 21a, is chosen to be equal to the pitch P of arrangement of the rolling elements 5. In this case, the distance of spacing between the two strain sensors 22A and 22B disposed at the middle positions of the neighboring contact fixing segments 21a becomes about ½ of the pitch P of arrangement of the rolling elements 5. As a result, the respective output signals a and b of the two strain sensors 22A and 22B has a about 180° phase difference and, hence, the average value A determined by the previously described preprocessing section 31 as the sum of the output signals a and b of the two strain sensor 22A and 22B becomes a value from which the component of change brought about by the passage of the rolling elements 5 has been cancelled. Also, the amplitude value B determined as the difference therebetween becomes a value in which the influences brought about by temperature and/or the slippage between the knuckle and the flange have been counterbalanced.

It is to be noted that in FIG. 6, the distance of spacing of the contact fixing segments 21a has been described as set to a value equal to the pitch P of arrangement of the rolling elements 5, with the strain sensors 22A and 22B positioned at the respective middle positions between the neighboring contact fixing segments 21a, so that the distance of spacing between the two strain sensors 22A and 22B in the circumferential direction can assume about ½ of the pitch P of arrangement of the rolling elements 5. Separate therefrom, however, the distance of spacing between the two strain sensors 22A and 22B may be directly set to a value equal to the ½ of the pitch P of arrangement of the rolling elements 5.

In this case, the distance of spacing between the two strain sensors 22A and 22B in the circumferential direction may be chosen to be (½+n) (n being an integer) times the pitch P of arrangement of the rolling elements 5 or a value approximating thereto. Even in this case, the sum of the output signals a and b of the strain sensors 22A and 22B can represent that from which the component of change caused by the passage of the rolling elements 5 has been cancelled.

The evaluation value calculation section 32 referred to previously is operable to calculate one or more evaluation values $E_i$ which become an index for switching a parameter in an estimation calculating equation, which is used in the load estimation calculating section 35 as will be described later, with the use of, for example, the amplitude value B within a predetermined time of each of the sensor output signals calculated by the preprocessing section 31. It is to be noted that the suffix "i" appended to the reference symbol "E" is for identifying a plurality of parameter switching conditions. By way of example, as the evaluation value $E_i$, arrangement may be made to calculate the summation of the previously discussed amplitude values B as one example of determining an indication of the vehicle travelling speed. Other than it, as the evaluation value $E_i$, a steering angle may be outputted from the evaluation value output section 32, or a wheel-turning angle signal may be outputted. Also, arrangement may be made so that the difference of the amplitude values B determined from the sensor output signals of the sensor units 20 provided at the upper and lower surface areas of the outer diametric surface of the outer member 1, which correspond respectively to the top and bottom positions relative to the tire tread surface, may be calculated. Moreover, as the evaluation value $E_i$, arrangement may be so made that the difference of the amplitude values B determined from the sensor output signals of the sensor units 20 provided at the left and right surface areas of the outer diametric surface of the outer member 1, which correspond respectively to the left and right positions relative to the tire tread surface, may be calculated. A value which has been conjugated by selecting two or more evaluation values out from the previously described plurality of the evaluation values Ei may be calculated as the evaluation value.

In the parameter switching section 34, the previously described evaluation value Ei is compared with a predetermined threshold value Ci and the parameter of the estimation calculating equation previously described is switched in reference to the result of such comparison.

In the Fy direction determining section 33 referred to previously, the direction of the axially acting load Fy is determined by the following manner. As hereinbefore described, during the rotation of the wheel support bearing assembly, the amplitude of a sensor output signal of the sensor unit 20 accompanies a cyclic change similar to the sinusoidal wave, and the amplitude value thereof changes depending on the magnitude of the axially acting load (moment force) Fy. FIG. 15 (Chart A) illustrates the sensor output of the sensor unit 20 disposed at the upper surface area of the outer diametric surface of the outer member 1 and FIG. 15 (Chart B) illustrates the sensor output of the sensor unit 20 disposed at the lower surface area of the outer diametric surface of the outer member 1.

Figure 16:
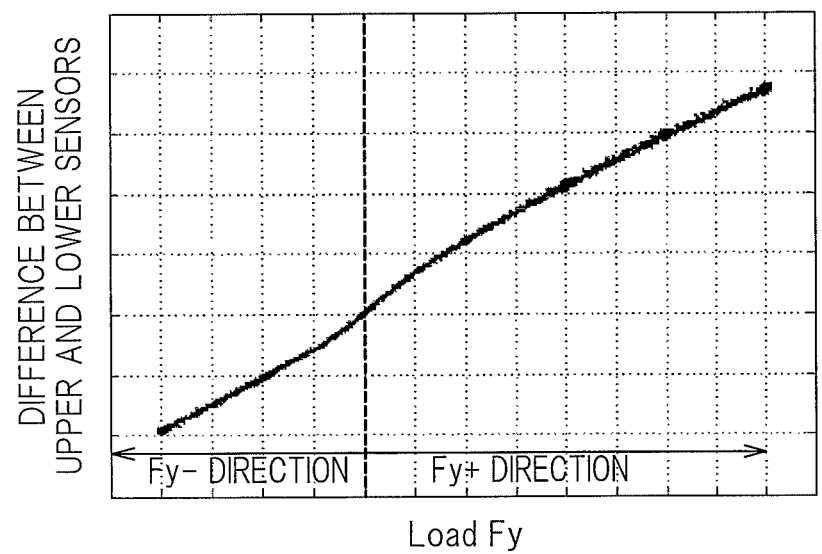
FIG. 16 is a chart showing the relation between the magnitude of the axially acting load and the difference between the sensor output signals of upper and lower sensor units.
Figure 17:
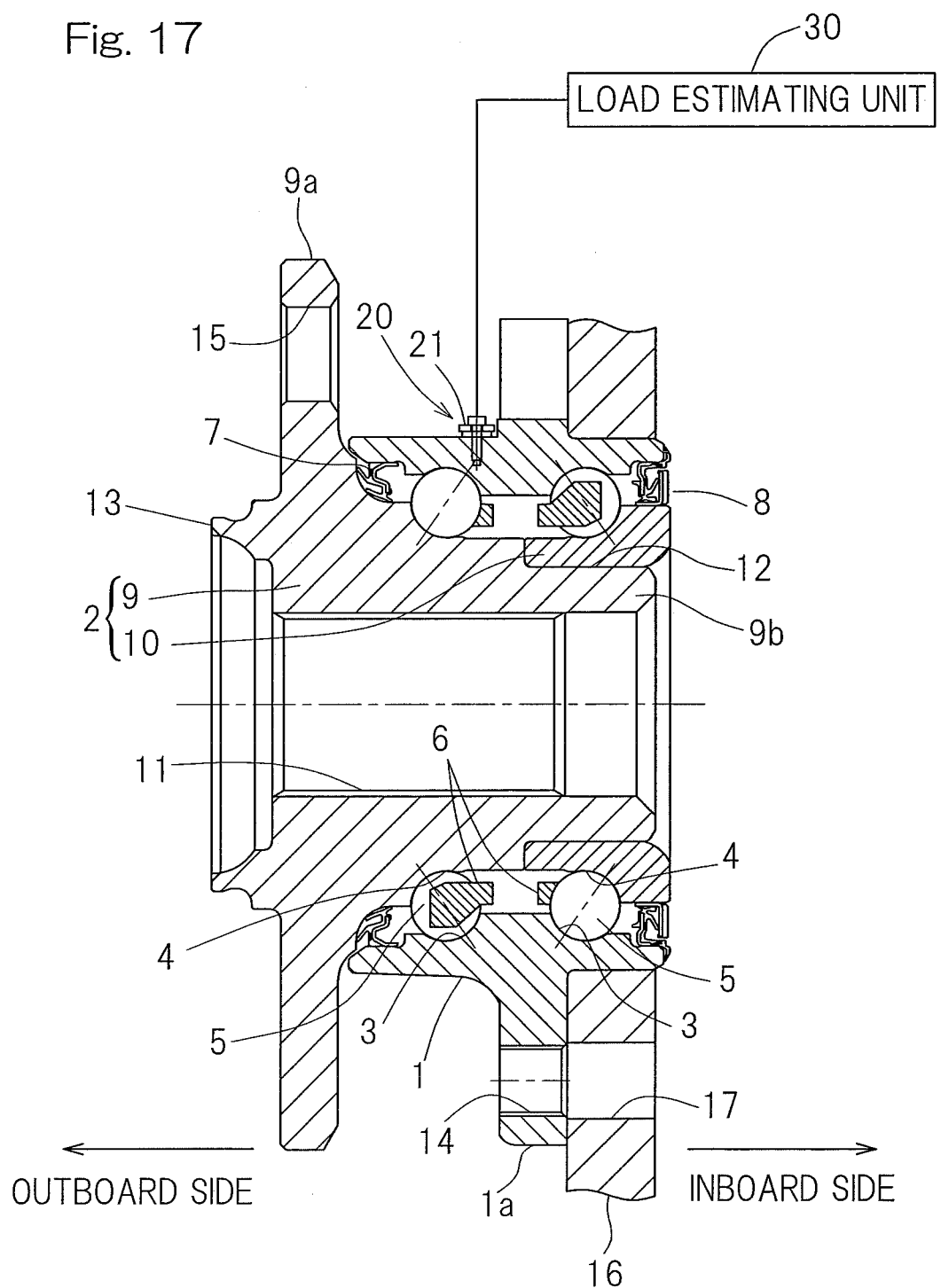
FIG. 17 is a diagram showing a combination of a longitudinal sectional view of the sensor equipped wheel support bearing assembly and the conceptual construction of the detecting system therefor, designed in accordance with a second embodiment of the present invention.
Figure 18:
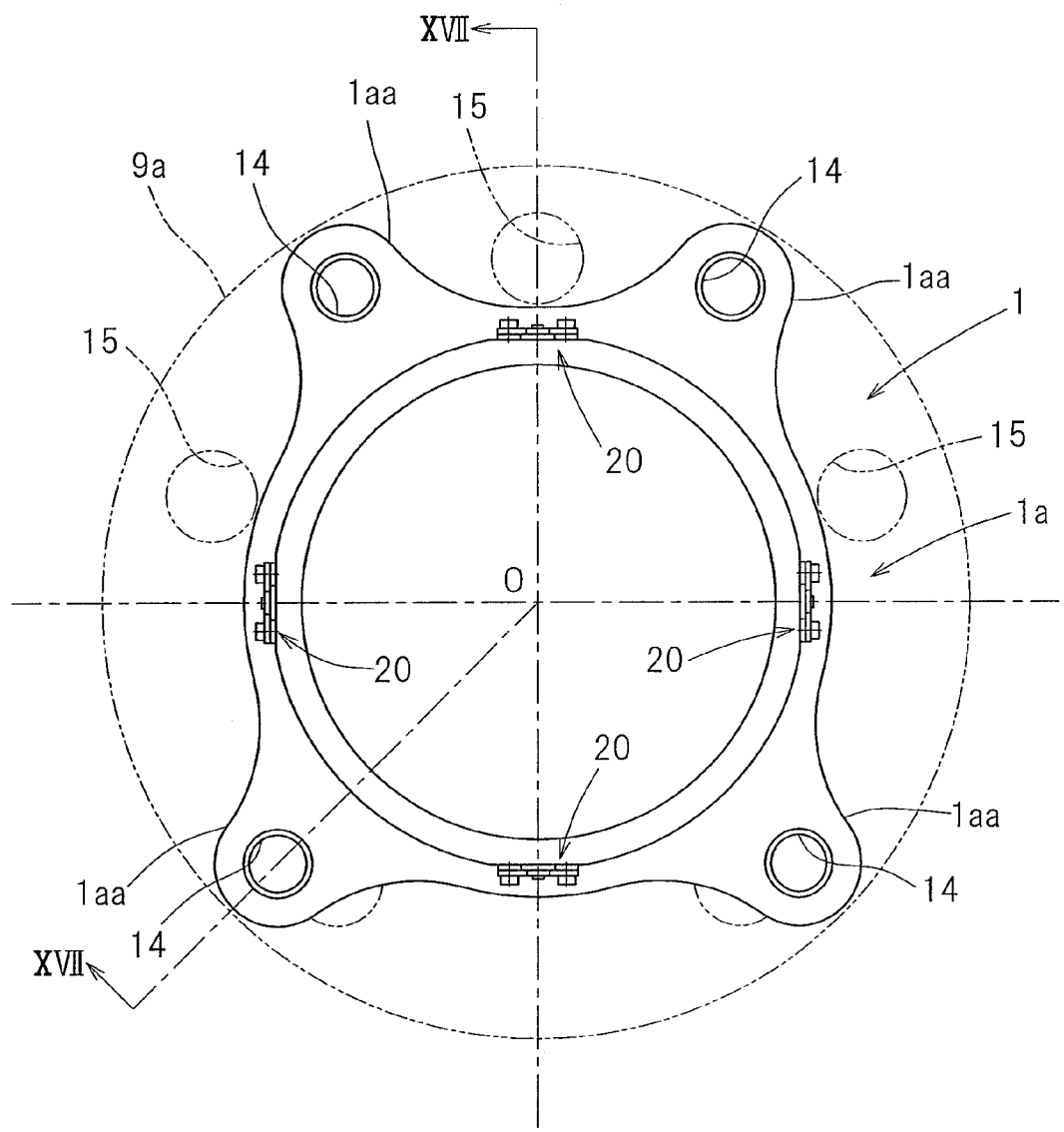
FIG. 18 is a front elevational view of the outer member, employed in the sensor equipped wheel support bearing assembly, as viewed from the outboard side.
Figure 19:
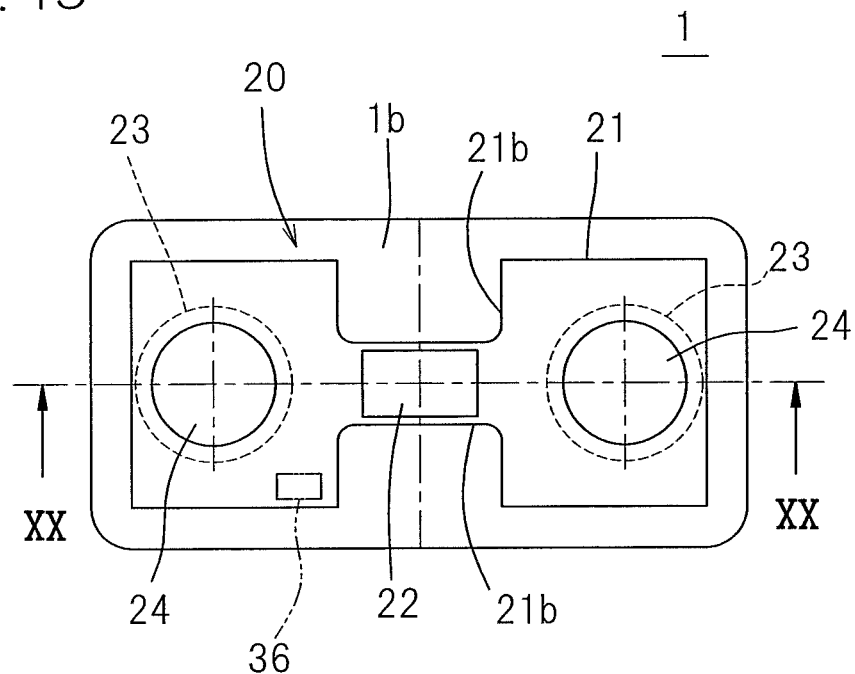
FIG. 19 is an enlarged plan view of the sensor unit employed in the sensor equipped wheel support bearing assembly.

In those Charts, the axis of abscissas represents the axially acting load Fy and the axis of ordinates represents the amount of strain in the outer member 1, that is, the sensor output signal, and the maximum value and the minimum value represent respectively the maximum value of the signal and the minimum value of the signal. From those Charts, it will be readily understood that in the case of the axially acting load Fy being in a plus (+) direction, the loads of the individual rolling elements 5 becomes small (in other words, the difference between the maximum and minimum values of the amplitude becomes small) at the upper surface area of the outer diametric surface of the outer member 1, but becomes large (in other words, the difference between the maximum and minimum values of the amplitude becomes large) at the lower surface area of the outer diametric surface of the outer member 1. Conversely, it will be readily understood that in the case of the axially acting load Fy being in a minus (−) direction, the loads of the individual rolling elements 5 becomes large at the upper surface area of the outer diametric surface of the outer member 1, but becomes small at the lower surface area of the outer diametric surface of the outer member 1. FIG. 16 illustrates a chart showing the relationship between the difference in amplitude of the sensor output signals of the upper and lower sensor units 20 and the direction of the axially acting load Fy.

In view of the above, in the Fy direction determining section 33 referred to previously, by determining the above described difference in amplitude between the respective sensor output signals of the sensor units 20 disposed at the upper and lower surface areas of the outer diametric surface of the outer member 1 and then comparing those values, the direction of the axially acting load Fy is determined. In other words, when the difference between the maximum and minimum values of the amplitudes of those sensor output signals at the upper surface area of the outer diametric surface of the outer member 1 is small, and the difference between the maximum and minimum values of the sensor output signals of the sensor unit 20 at the lower surface area of the outer diametric surface of the outer member 1 is large, the Fy direction determining section 33 determines that the direction of the axially acting load Fy is in the plus direction. Conversely, when the difference between the maximum and minimum values of those sensor output signals at the upper surface area of the outer diametric surface of the outer member 1 is large, and the difference between the maximum and minimum values of the sensor output signals of the sensor unit 20 at the lower surface area of the outer diametric surface of the outer member 1 is small, the Fy direction determining section 33 determines that the direction of the axially acting load Fy is in the minus direction. In correspondence therewith, the parameter switching section 34 referred to previously includes a direction correspondent command block 34a operable to apply to the load calculating section 35 a command for, for example, selecting a parameter of the calculation estimating equation upon reflection of the result of determination, performed by the Fy direction determining section 33, when the calculation of the axially acting load Fy takes place in the load calculating section 35.

In the load estimation calculating section 35 referred to previously, the loads Fz, Fx and Fy acting on the wheel support bearing assembly are calculated and estimated by applying the respective sensor output signals of each of the sensor units 20 to the predetermined estimation calculating equation. As a variable in the estimation calculating equation in this case, only the average value A determined by the preprocessing section 31 or only the amplitude value B may be used, or both of the average value A and the amplitude value B may be used. This load calculating section 35 has a calculation correcting block 35a for correcting a result of calculation by combining two load estimation results, calculated by the estimation calculating equation with the use of a parameter within an evaluation value region on both sides containing the threshold value Ci, when the evaluation value Ei falls within the predetermined region containing the threshold value Ci.

In the parameter switching section 34, comparison of the evaluation value Ei with the threshold value Ci and, depending on the result of such comparison, the parameter of the estimation calculating equation is switched. In other words, when the evaluation value Ei is within a region, in which the evaluation value Ei is expressed by the equation (1) below, a coefficient M1 best shown in FIG. 7 is used as the parameter of the estimation calculating equation, and when the evaluation value Ei is within a region, in which the evaluation value Ei is expressed by the equation (2) below, a coefficient M2 also best shown in FIG. 7 is used as the parameter in the estimation equation:

$$Ci \geq Ei \ldots \quad (1)$$

$$Ci < Ei \ldots \quad (2)$$

Figure 7:
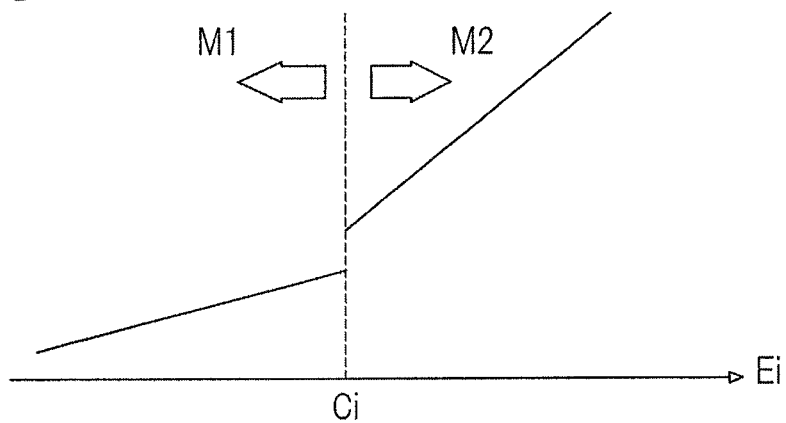
FIG. 7 is a chart showing a discontinuity of an estimation calculating equation in the event that a parameter of the estimation calculating equation is switched.
Figure 8:
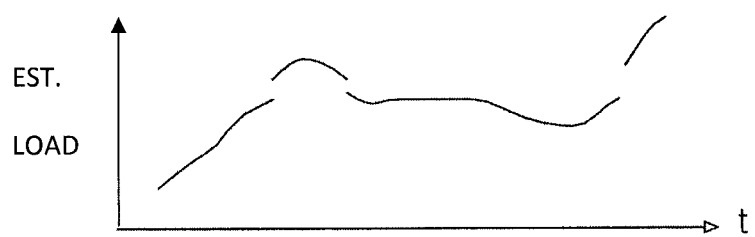
FIG. 8 is a chart showing a discontinuity of an estimated load value in the event that a parameter of an estimation calculating equation is switched.

In the meantime, if in the parameter switching section 34 the parameter of the estimation calculating equation used by the load estimation calculating section 35 is switched as shown in FIG. 7 in dependence on a plurality of conditions, it may occur that the estimated load value obtainable from the result of such calculation will become discontinuous upon switching It is to be noted that in FIG. 7, the axis of abscissas represents the evaluation value Ei used in switching the parameter and the axis of ordinates represents the estimated load value calculated. In this condition, the result of the load estimation in chronological order is such as shown in FIG. 8 and discontinuous portions appear. It is also to be noted that in FIG. 8, the axis of abscissas represents time and the axis of ordinates represents the estimated load value calculated. In particular, where a situation, in which an input condition lies in the vicinity of a parameter switching, continues, it may occur that the parameter switching will frequently occur due to slight changes in input. In other words, when the evaluation value Ei traverses the threshold value Ci, a condition occurs in which the estimated load value changes discontinuously. Where the evaluation value Ei remains in the vicinity of the threshold value Ci, the estimated load value in the chronological order is such as shown in FIG. 8 and frequent discontinuous portions appear. Should the estimated load value changes discontinuously as discussed above, it may occur that an error in the estimated load value outputted will become large or that it will assume an estimated load value of a characteristic different from that it should have been normally.

In a control system such as, for example, a control system used in the automotive vehicle, in which various operations are executed on the basis of the estimated load value, the discontinuous change of the estimated load value in the manner as hereinabove discussed is undesirable. Accordingly, as a measure to remove the discontinuity, the calculation correcting block 35a provided in the load estimation calculating section 35 performs the following process.

Figure 9:
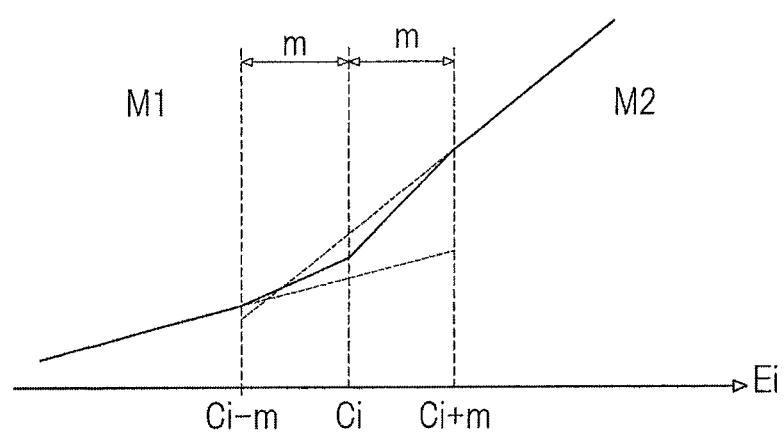
FIG. 9 is a chart showing one example of the relation between a predetermined region, containing a threshold value in an evaluation value, and the parameter of the estimation calculating equation corrected in dependence on this region.

At the outset, in the vicinity of the threshold value Ci with which the parameter of the estimation calculating equation in the evaluation value Ei is switched, a boundary region [Ci−m, Ci+m] of 2×m in width as shown in FIG. 9, for example, is provided. Within this region, a process of calculating the estimated load, in which the discontinuity of the estimated load value on respective sides of the threshold value Ci in the evaluation value Ei is taken into consideration, is carried out.

By way of example, let it be assumed that the parameter of the estimation calculating equation within the left region of the threshold value Ci is expressed by M1 and the parameter of the estimation calculating equation within the right region is expressed by M2. Assuming also that the load estimation values calculated by the use of those parameters are expressed by F(M1) and F(M2), the corrected estimation calculating equation F is generated by combining the estimation calculating results within those regions referred to above.

$$F = \alpha F(M1) + \beta F(M2) \ldots \quad (3)$$

$$\alpha + \beta = 1 \ldots \quad (4)$$

Figure 10:
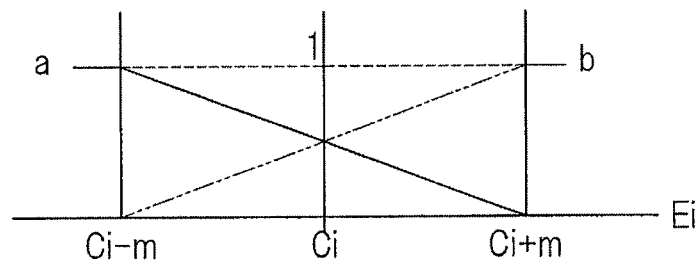
FIG. 10 is a chart showing the relation between the estimated value in this example and a correction coefficient used to correct the parameter.
Figure 11:
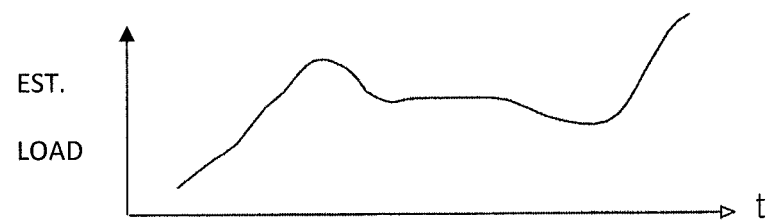
FIG. 11 is a chart showing a time dependent change of a load calculation result in this example.

In this instance, $\alpha$ and $\beta$ satisfy such a relation as shown by the equation (4) and represent a proportion of the estimated load F(M1) and a proportion of the estimated load F(M2), respectively. For example, as shown in FIG. 10, $\alpha$ and $\beta$ may have a ralation that changes linearly within the boundary region referred to previously. In this case, the estimated load value within the boundary region changes in a manner similar to a polygonal line as shown in FIG. 9. Assuming that the increment from the threshold value Ci is expressed by x, the relation between $\alpha$ and $\beta$ becomes as shown by the following equation (5).

$$\alpha/\beta = (m-x)/(m+x) \ldots \quad (5)$$

Figure 12:
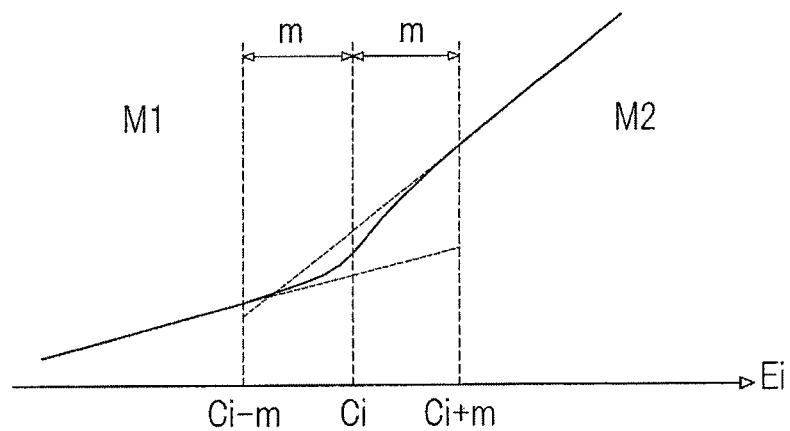
FIG. 12 is a chart showing another example of the relation between the predetermined region, containing the threshold value in the evaluation value, and the parameter of the estimation calculating equation corrected in dependence on this region.
Figure 13:
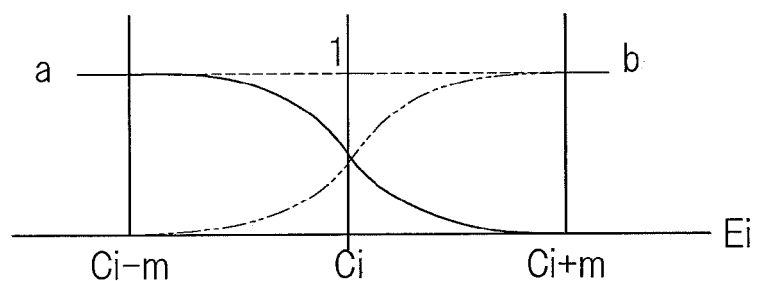
FIG. 13 is a chart showing the relation between the estimated value in this example and the correction coefficient used to correct the parameter.

Other than that, the proportion of each of the estimated loads F(M1) and F(M2) may be a combined proportion expressed by the quadratic curve shown in FIG. 13. In such case, the estimated load value within the previously described boundary region changes smoothly as shown in FIG. 12. Owning to the process performed in the calculation correcting block 35a, the estimated load value calculated by the load calculating section 35 may have a continuity as shown by a chronological change in FIG. 11. Accordingly, since while the switching is made to render the parameter of the estimation calculating equation used in the load calculating section 35 to suit to the travelling condition of the automotive vehicle, the discontinuous portions are eliminated from the estimated load value calculated, the accuracy of the load estimation increases and it can be easily adapted to the control system for executing the various operation on the basis of the estimated load.

It is to be noted that the types of the estimated load outputted are not necessarily limited to the loads Fx, Fy and Fz in the previously described three directions, but can be so designed as to add a parameter of the estimation calculating equation F in the load estimation calculating section 35 to calculate the steering moment Mz and the moment Mx about an X axis.

In addition, a temperature sensor 36 may be fitted to the sensor unit 20 as shown in FIG. 3 so that each of the sensor output signals can be corrected in reference to a detection signal of the temperature sensor 36. In the circuit block diagram shown in FIG. 14, there is shown an example of construction in which in the preprocessing section 31, the average value A calculated as the sum of the respective output signals of the two sensors 22A and 22B is corrected by a temperature correcting unit 37 using the detection signal of the temperature sensor 36. When the temperature of the wheel support bearing assembly changes as a result of heat emission resulting from the rotation of the bearing and ambient environments, the sensor output signal of the sensor unit 20 undergoes a change as a result of, for example, a thermal expansion even though no load change, and, therefore, influences of the temperature may remain in the detected load. Accordingly, by correcting each of the sensor output signals in reference to the detection signal of the temperature sensor 36 as hereinabove described, a detected load error brought about by the temperature can be reduced.

When the load acts between the tire on the vehicle wheel and the road surface, the load is also applied to the outer member 1, which is the stationary member of the wheel support bearing assembly shown in FIG. 1, accompanied by deformation. Since in this embodiment the three contact fixing segments 21a of the strain generating member 21 in the sensor unit 20 are fixed to the outer member 1 in contact therewith, the strain in the outer member 1 is, after having been magnified, easily transmitted to the strain generating member 21 and such strain is detected by the strain sensors 22A and 22B with high sensitivity with the hysteresis occurring in such output signal consequently reduced.

In particular, in the load estimating unit 30 having the load calculating section 35 for calculating the load acting on the wheel support bearing assembly by applying the sensor output signal of each of the sensor units 20 to the predetermined estimation calculating equation, one or more evaluation values Ei (shown in FIG. 7), which will be used as the index for switching the parameter of the estimation calculating equation, from the sensor output signal of the plurality of sensor units 20 are calculated by the evaluation calculating section 32 and the evaluation value Ei is compared with the threshold value Ci, which is set in advance (also shown in FIG. 7), in the parameter switching section 34, and the parameter referred to above is switched in dependence on the result of such comparison. Also, in the load calculating section 35, when the evaluation value Ei is within the predetermined region on both sides of the threshold value Ci, the calculation correcting block 35a corrects the result of calculation by combining the two load estimating results calculated by the previously described estimation calculating equation with the use of the parameter within the evaluation value region on both sides of the threshold value Ci. For this reason, the continuous estimated load can be obtained in dependence on the various inputted load conditions while the non-linearity of the strain sensors 22A and 22B is corrected to thereby reduce the load estimation error.

Figure 20:
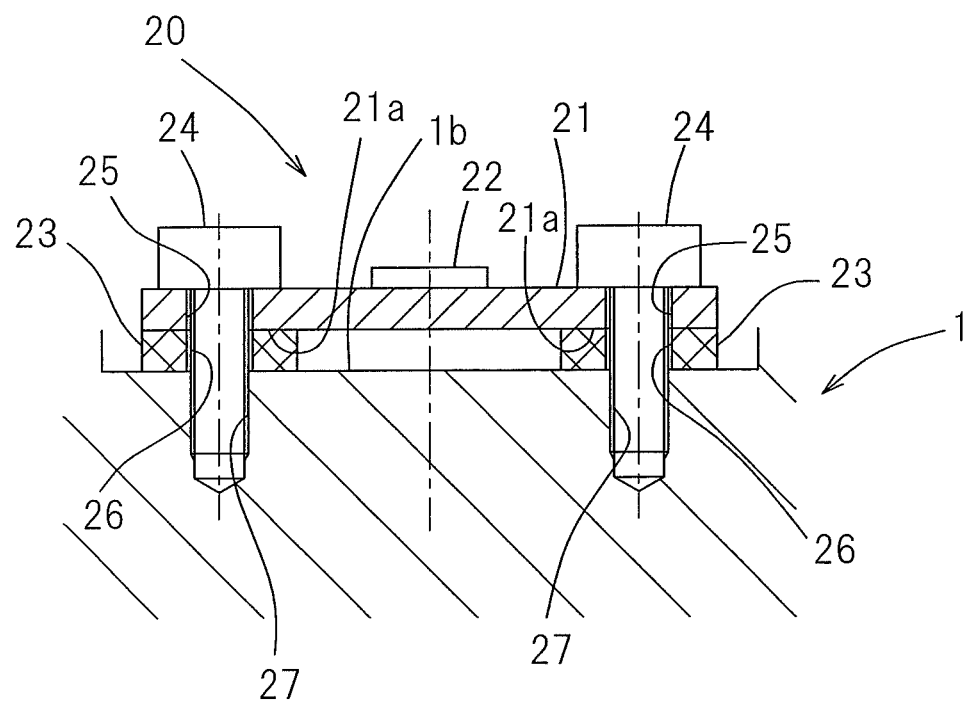
FIG. 20 is a cross sectional view taken along the line XX-XX in FIG. 19.
Figure 21:
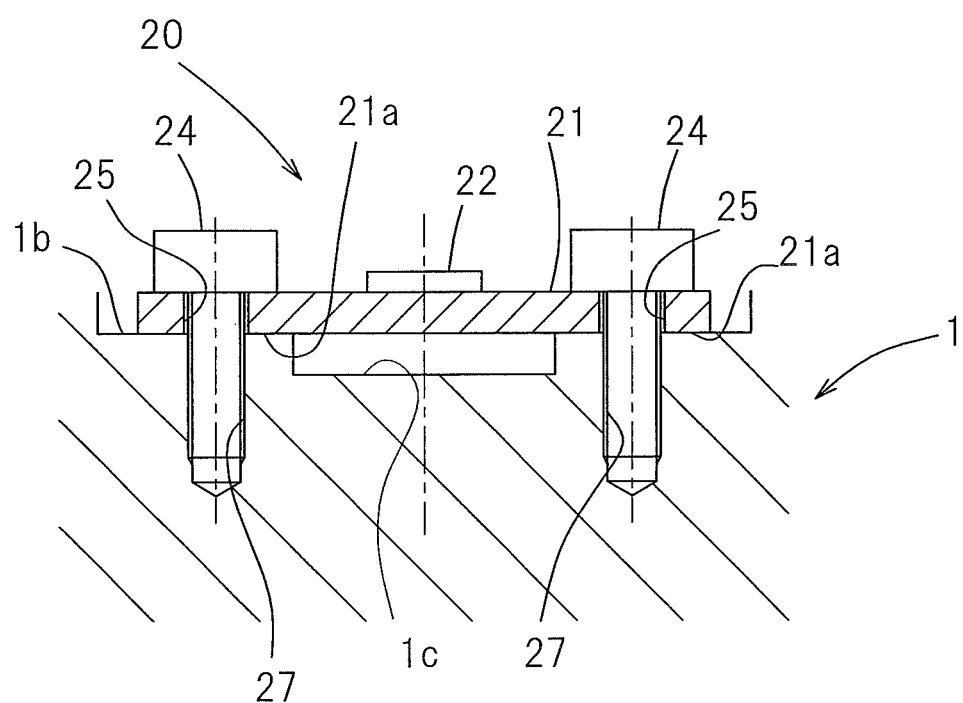
FIG. 21 is a sectional view showing another example of installation of the sensor unit.

FIGS. 17 to 21 illustrate a second embodiment of the present invention. This sensor equipped wheel support bearing assembly according to the second embodiment is similar to the sensor equipped wheel support bearing assembly shown in and described with reference to FIGS. 1 to 16 in connection with the first embodiment, but differs therefrom in respect of the details of each of the sensor unit 20. In this case, as shown in FIG. 20 in an enlarged longitudinal sectional representation, the sensor unit 20 includes a strain generating member 21 and one strain sensor 22 fitted to the strain generating member 21 for detecting the strain occurring in the strain generating member 21. The strain generating member 21 has at its opposite ends two contact fixing segments 21a that are fixed to the outer diametric surface of the outer member 1 through respective spacers 23 in contact therewith. Alternatively or additionally, as shown in FIG. 21 in a sectional representation, a groove 1c may be provided at a location intermediate between two portions of the outer diametric surface of the outer member 1, at which the two contact fixing segments 21a of the strain generating member 21 are fixed to the outer diametric surface of the outer member 1 so that, while the use of the spacer 23 is dispensed with, a site of the strain generating member 21, where the cutout portions 21b are defined, can be spaced a distance from the outer diametric surface of the outer member 1.

In the meantime, according to the sensor equipped wheel support bearing assembly according to any one of the previously described embodiments of the present invention, although a certain excellent effect can be obtained as compared with the conventional sensor equipped wheel support bearing assembly, with the load estimating unit 30 employed therein, it may occur that the estimated load value obtained as a result of the calculation performed in the load estimation calculating section 35 may result in an increase of the discontinuous change or error in the estimated load value upon switching of the parameter of the estimation calculating equation.

In other words, as shown in FIG. 1, in the load estimating unit 30 having the load calculating section 35 for calculating the load acting on the wheel support bearing assembly by applying the sensor output signal of each of the sensor units to the estimation calculating equation, one or more evaluation values Ei, which are used as an index for switching the parameter of the estimation calculating equation, are calculated by the evaluation value calculation section 33 from the sensor output signals of the plurality of the sensor units and, also, the evaluation value Ei is compared with the predetermined threshold value Ci in the parameter switching section 34, with the parameter consequently switched as a result of such comparison. Also, in the load calculating section 35, when the evaluation value Ei is within the predetermined region on both sides of the threshold value Ci, the calculation correcting block 35a corrects the result of calculation by combining the two load estimation results calculated by the estimation calculating equation with the use of the parameter within the evaluation value region on both sides of the threshold value Ci. For this reason, while the non-linear characteristic of the sensor is corrected to reduce the load estimation error, the continuous estimation load value can be obtained in dependence on the various inputted load conditions.

However, even in the case of such a construction as described above, it may occur that in the event that the situation, in which the input load condition is in the vicinity of the parameter switching, continues, a frequent parameter switching will result in as a result of a delicate change in input. In this case, where the estimation load value changes discontinuously upon switching of the load estimating parameter, the error in the estimated load value outputted will become large or that it will assume an estimated load value of a characteristic different from that it should have been normally. To the control system such as, for example, a control system used in the automotive vehicle, in which various operations are executed on the basis of the estimated load value, the discontinuous change of the estimated load value in the manner as hereinabove discussed and the increase of the error are undesirable.

A third embodiment, which will now be described with particular reference to FIGS. 22 to 25, is aimed at resolving such a problem as hereinabove discussed. In describing the third embodimen, component parts thereof that are similar to those used in any one of the first embodiment, shown in and described with particular reference to FIGS. 1 to 16, and the second embodiment shown in and described with particular reference to FIGS. 17 to 21, are designated by like reference numerals and, therefore, the details thereof are not reiterated for the sake of brevity.

Figure 22:
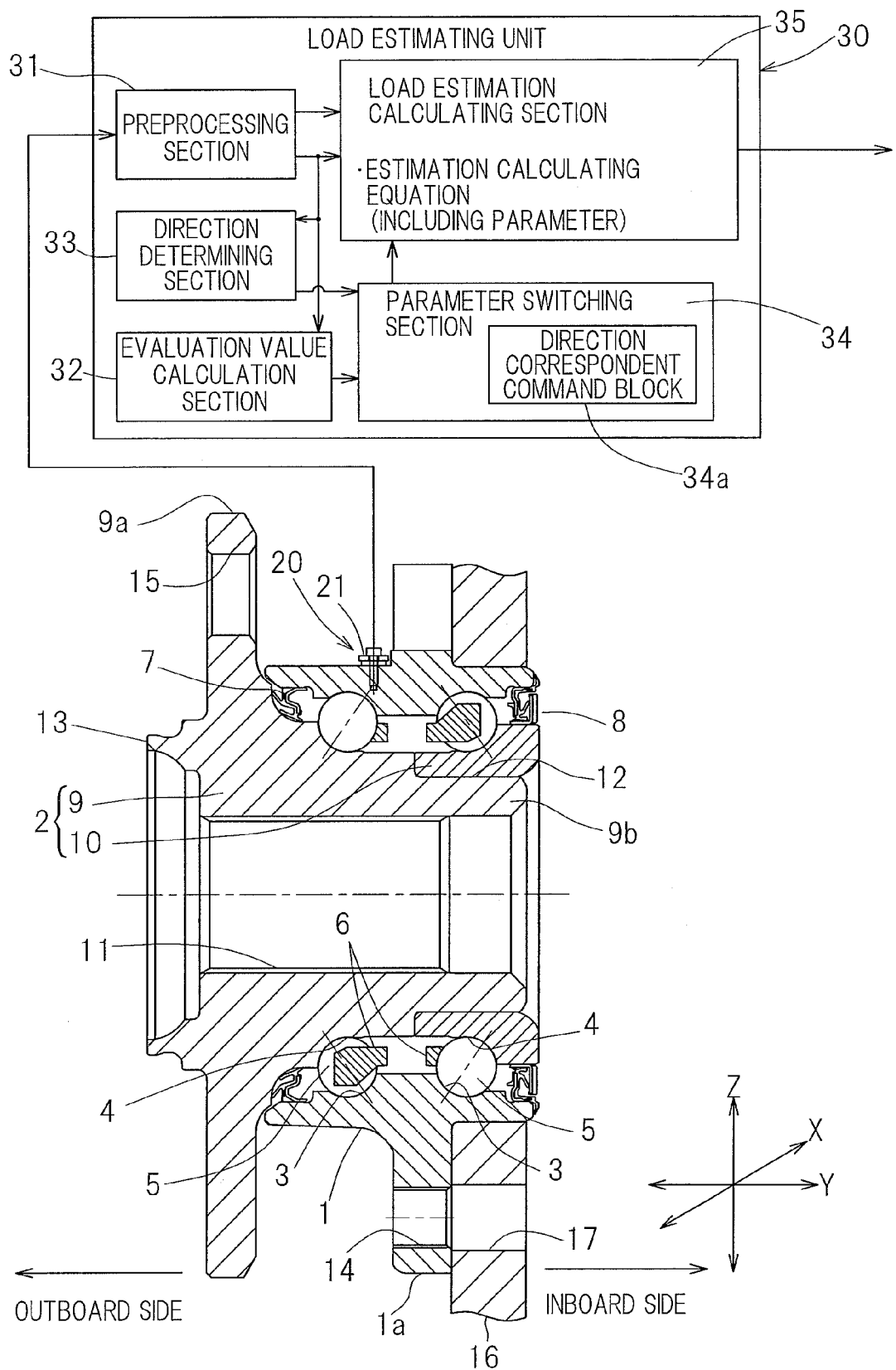
FIG. 22 is a diagram showing a combination of a longitudinal sectional view of the sensor equipped wheel support bearing assembly and the conceptual construction of the detecting system therefor, designed in accordance with a third embodiment of the present invention.

As shown in FIG. 22, in the practice of the third embodiment shown therein, no calculation correcting block 35a in the load estimating unit 30 employed in the practice of the first embodiment shown in FIG. 1 is employed. In place of the use of the calculation correcting block employed in the load estimating unit 30 in the practice of the first embodiment, a load estimating unit 30 employed in the practice of the third embodiment is made up of a load estimation calculating section 35 for calculating a load, acting on the wheel support bearing assembly, by applying the output signal of each of the sensor units to the predetermined estimation calculating equation, an evaluation value calculation section 32 for outputting one or more evaluation values which will become an index for switching a parameter in the estimation calculating equation, and a parameter switching unit for comparing the evaluation value with a predetermined threshold value and then switching the parameter in the estimation calculating equation in dependence on the result of such comparison, in which the hysteresis is set in such predetermined threshold value.

Figure 23:
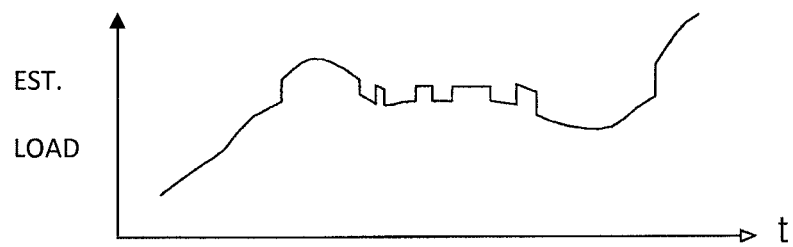
FIG. 23 is a chart showing the discontinuity of the estimated load value in the event that the parameter of the estimation calculating equation is switched.

In particular, where a situation, in which an input condition lies in the vicinity of a parameter switching, continues, it may occur that the parameter switching will frequently occur due to a delicate change in input. In other words, when the evaluation value Ei traverses the threshold value Ci, a condition occurs in which the estimated load value changes discontinuously. However, where the evaluation value Ei remains in the vicinity of the threshold value Ci, the estimated load value in the chronological order is such as shown in FIG. 23 and frequent discontinuous portions appear. Should the estimated load value changes discontinuously as discussed above, it may occur that an error in the estimated load value outputted will become large or that it will assume an estimated load value of a characteristic different from that it should have been normally.

Figure 24:
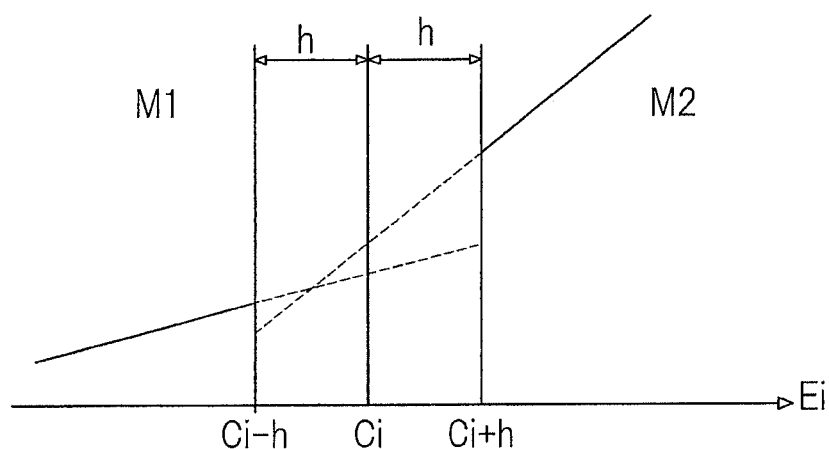
FIG. 24 is a chart showing one example of the relation between the evaluation value and the hysteresis of the threshold value.

In the practice of the third embodiment, as a measure to remove the discontinuity of the estimated load value, a hysteresis such as shown in FIG. 24 is set to the threshold value Ci that is used by the parameter switching section 34 and, then, the parameter in the estimation calculating equation is switched in the following manner. It is to be noted that in FIG. 24, the magnitude of the hysteresis is indicated by ±h. In other words, when the evaluation value Ei increases, the threshold value at the time of switching of the parameter in the estimation calculating equation is rendered to be $C_i+h$, while when the evaluation value Ei decreases, the threshold value is set to $C_i-h$. By so doing, once the switching of the parameter in the estimation calculating equation occurs, the threshold value is changed for the switching in a reverse direction and, therefore, a frequent parameter switching does no longer occur.

Figure 25:
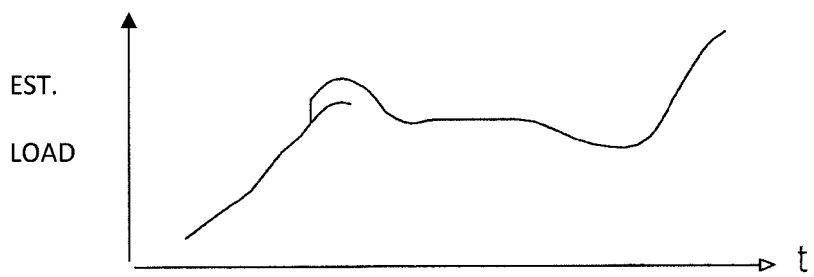
FIG. 25 is a chart showing the time dependent change of the load estimation result in this example.
Figure 26:
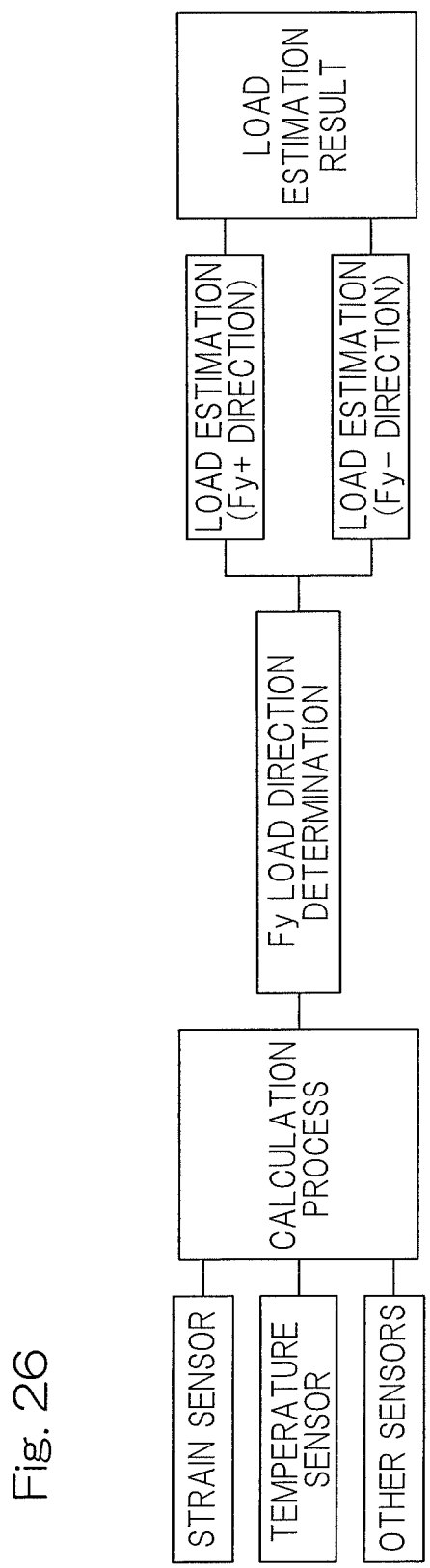
FIG. 26 is an explanatory diagram used to explain the flow of a load estimating process in the suggested example.
Figure 27:
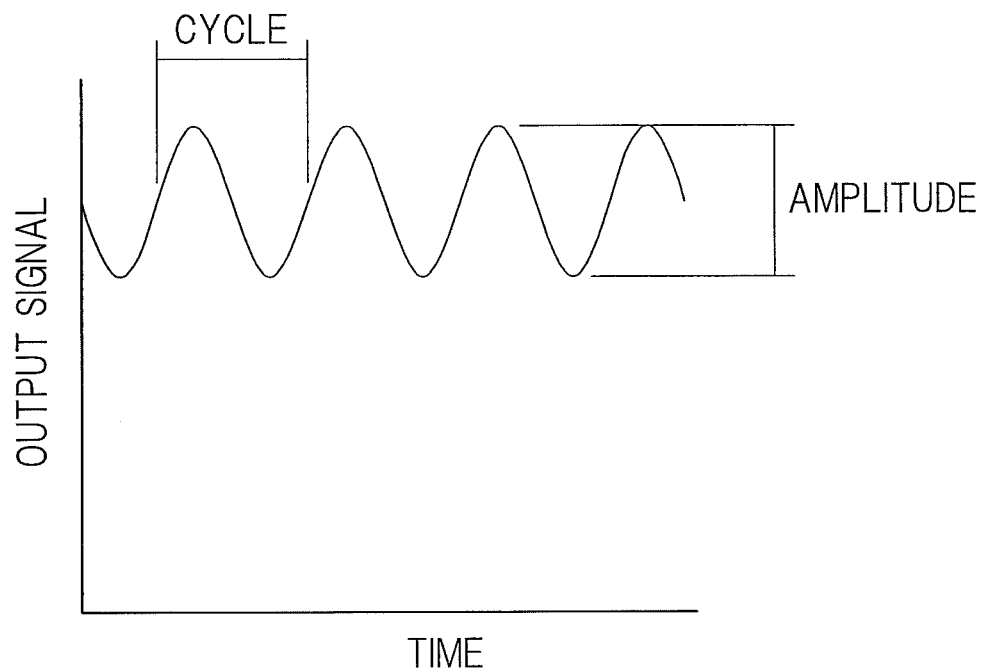
FIG. 27 is a diagram showing the waveform of the sensor output signal in the suggested example.
Figure 28:
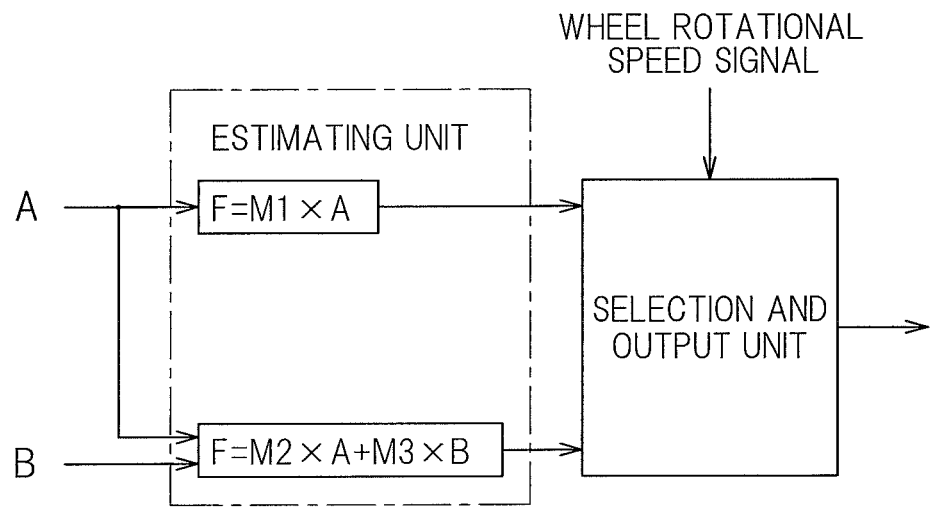
FIG. 28 is a block diagram showing a schematic construction of a load estimating unit used in the practice of a different suggested example.

As hereinabove described, even when a condition occurs in which the evaluation value Ei is brought in the vicinity of the threshold value Ci, without the parameter in the estimation calculating equation taking place frequently, there is no possibility that a discontinuous output condition will no longer occur continuously and the estimated load value comes to have a continuity as shown in FIG. 25 in the chronological order. As a result, since while the parameter in the estimation calculating equation that is used by the load calculating section 35 is switched to suit to the travelling condition of the automotive vehicle, the discontinuous portions are eliminated from the estimated load value so calculated, the load estimating accuracy increases and it will suit to the control system for executing various operations on the basis of the estimated load. The magnitude of the hysteresis ±h referred to previously can be adjusted to an optimum value in dependence on the previously discussed parameter so that the error at the time of the load estimation can be reduced.

In particular, with the load estimating unit 30 including the load calculating section 35 for calculating the load, acting on the wheel support bearing assembly, by applying the sensor output signal of each of the sensor units 20 to the predetermined estimation calculating equation, one or more evaluation values Ei, which will become an index for switching the parameter in the estimation calculating equation, are outputted from the evaluation value calculation section 32 and, also, such evaluation value Ei is compared with the predetermined threshold value Ci in such parameter switching section 34, wherefore depending on the result of such comparison the parameter referred to above is switched. Moreover, the hysteresis is set to such threshold value Ci. For this reason, no frequent parameter switching within the boundary region of switching of the parameter in the estimation calculating equation occur and it is possible to suppress the possibility that the estimated load value, which is calculated by and outputted from the load calculating section 35, may become discontinuous. As a result, while the load estimation error is reduced by correcting the non-linear characteristic of the strain sensors 22A and 22B, the continuous estimated load can be obtained in dependence on various inputted load conditions.

Since one strain sensor 22 is fitted to each of the sensor units 20, in the preprocessing section 31 of the load estimating unit 30, the output signal of the single strain sensor 22 in each of the sensor units 20 is observed for a predetermined length of time and the average value A and the amplitude value B of such sensor output signal can be obtained. Other structural features are generally similar to those in the previously described first embodiment of the present invention.

It is to be noted that although in describing any of the foregoing embodiments of the present invention, the outer member 1 has been shown and described as constituting the stationary member, the present invention can be equally applied to any wheel support bearing assembly in which the inner member serves as the stationary member. In such case, the sensor units 20 are provided on a peripheral surface which will become an inner periphery of the inner member.

Also, although in describing any of the foregoing embodiments of the present invention, the present invention has been shown and described as applied to the wheel support bearing assembly of the third generation type, the present invention can be equally applied to the wheel support bearing assembly of a second generation type, in which a bearing part and a hub are members independent or separate from each other, and also to the wheel support bearing assembly of a fourth generation type, in which a portion of the inner member is constituted by an outer ring of a constant velocity universal joint. In addition, this sensor equipped wheel support bearing assembly can be used as a wheel support bearing assembly for the support of a vehicle driven wheel and also to a wheel support bearing assembly of any generation model that utilizes tapered rollers.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Outer member
2 . . . Inner member
3, 4 . . . Rolling surface
5 . . . Rolling element
20 . . . Sensor unit
21 . . . Strain generating member
21a . . . Contact fixing segment
22, 22A, 22B . . . Strain sensor
30 . . . Load estimating unit
31 . . . Preprocessing unit
32 . . . Evaluation value calculating unit
33 . . . Fy direction determining section
34 . . . Parameter switching section
34a . . . Direction correspondent command block
35 . . . Load estimation calculating section
35a . . . Calculation correcting block
36 . . . Temperature sensor

What is claimed:

1. A sensor equipped wheel support bearing assembly comprising:
a wheel support bearing for rotatably supporting a vehicle wheel relative to a vehicle body structure, the bearing comprising an outer member having an inner periphery formed with a plurality of rolling surfaces, an inner member having an outer periphery formed with rolling surfaces that face the respective rolling surfaces in the outer member, and a plurality of rows of rolling elements interposed between the rolling surfaces in the outer member and the rolling surfaces in the inner member;
a plurality of load detecting sensor units provided in one of the outer member and the inner member that serves as a stationary member, each of the sensor units including a strain generating member, having two or more contact fixing segments to be fixed to the stationary member in contact therewith, and one or more sensors fitted to the strain generating member for detecting a strain occurring in the strain generating member, the sensor units including upper, lower, right and left sensor units disposed at upper, lower, right and left surface areas of the outer diametric surface of the stationary member, respectively, which correspond respectively to top, bottom, right surface and left surface locations relative to a tire tread surface, in 90° phase difference relative to each other and in equidistantly spaced relation to each other;

a load estimating unit including a processor configured to estimate a load acting on the vehicle wheel from an output signal of the sensor in each of the sensor units, the load estimating unit including a load estimation calculating section for calculating the load acting on the wheel support bearing by applying the output of the sensor in each of the sensor units to an estimation calculating equation, an evaluation value calculation section for calculating one or more evaluation value to be used as an index for switching a parameter in the estimation calculating equation, from the output signal of the sensor in each of the sensor units, and a parameter switching section for comparing the evaluation value with a predetermined threshold value to switch the parameter in the estimation calculating equation in dependence on a result of such comparison;

the load estimation calculating section including a calculation correcting block for correcting a result of calculation by combining two load estimation results calculated by the estimation calculating equation with the use of the parameters within respective evaluation value regions on both sides of the threshold value in the event that the evaluation value is within a predetermined region containing the threshold value, wherein the evaluation value calculation section calculates as the evaluation value a combination of two or more evaluation values, the two or more evaluation values indicative of a travelling speed of an automotive vehicle, a difference between amplitude values of output signals of the upper and lower sensor units, and a difference between amplitude values of output signals of the right and left sensor units.

2. The sensor equipped wheel support bearing assembly as claimed in claim 1, wherein the load estimating unit is operable to estimate loads in three directions, including two radially acting loads acting in a vertical direction and a bilateral direction, which loads acts on the wheel support bearing, and one axially acting load acting in an axial direction, from output signals of the sensor units.

3. The sensor equipped wheel support bearing assembly as claimed in claim 1, wherein the load estimating unit further includes a direction determining section for determining the direction of the axially acting load by utilizing the difference between amplitude values of the respective output signals of sensors of the sensor units disposed at top and bottom positions relative to the tire tread surface in face to face relation to each other and in which the parameter switching section includes a direction correspondent command block for switching the parameter of the estimation calculating equation in the load estimation calculating unit in dependence on the result of determination performed by the direction determining section.

4. The sensor equipped wheel support bearing assembly as claimed in claim 1, wherein the load estimating unit includes a preprocessing section for calculating the average value and the amplitude value of the output signal of each of the sensors in each of the sensor units within a predetermined length of time and the estimation calculating equation in the load estimation calculating section calculates and processes the load with the use of one of only the average value and the amplitude value or with the use of both of the average value and the amplitude value.

5. The sensor equipped wheel support bearing assembly as claimed in claim 4, wherein each of the sensor units includes three or more contact fixing segments and two sensors, the sensors being fitted between the neighboring first and second contact fixing segments and between the neighboring second and third contact fixing segments, and wherein the distance of spacing between the neighboring contact fixing segments or the neighboring sensors in a direction circumferentially of the stationary member is chosen to ½+n times of a pitch of arrangement of the rolling elements, where n represents an integer, and the load estimating unit makes use of the sum of the output signals of the two sensors as an average value.

6. A sensor equipped wheel support bearing assembly comprising:

a wheel support bearing for rotatably supporting a vehicle wheel relative to a vehicle body structure, the bearing comprising an outer member having an inner periphery formed with a plurality of rolling surfaces, an inner member having an outer periphery formed with rolling surfaces that faces the respective rolling surfaces in the outer member, and a plurality of rows of rolling elements interposed between the rolling surfaces in the outer member and the rolling surfaces in the inner member;

a plurality of load detecting sensor units provided in one of the outer member and the inner member that serves as a stationary member, each of the sensor units including a strain generating member, having two or more contact fixing segments to be fixed to the stationary member in contact therewith, and one or more sensors fitted to the strain generating member for detecting a strain occurring in the strain generating member, the sensor units including upper, lower, right and left sensor units disposed at upper, lower, right and left surface areas of the outer diametric surface of the stationary member, respectively, which correspond respectively to top, bottom, right surface and left surface locations relative to a tire tread surface, in 90° phase difference relative to each other and in equidistantly spaced relation to each other;

a load estimating unit including a processor configured to estimate a load acting on the vehicle wheel from an output signal of the sensor in each of the sensor units, the load estimating unit including a load estimation calculating section for calculating the load acting on the wheel support bearing by applying the output of the sensor in each of the sensor units to an estimation calculating equation, an evaluation value output section for outputting one or more evaluation value to be used as an index for switching a parameter in the estimation calculating equation, and a parameter switching section for comparing the evaluation value with a predetermined threshold value to switch the parameter in the estimation calculating equation in dependence on a result of such comparison, the threshold value having a hysteresis set thereto, wherein the evaluation value output section calculates as the evaluation value a combination of two or more evaluation values, the two or more evaluation values indicative of a travelling speed of an automotive vehicle, a difference between amplitude values of output signals of the upper and lower sensor units, and a difference between amplitude values of output signals of the right and left sensor units.

7. The sensor equipped wheel support bearing assembly as claimed in claim 6, wherein the evaluation value outputted by the evaluation value output section is a signal indicative of a travelling speed of an automotive vehicle.

8. The sensor equipped wheel support bearing assembly as claimed in claim 6, wherein the load estimating unit is operable to estimate loads in three directions, including two radially acting loads acting in a vertical direction and a bilateral direction, which loads acts on the wheel support bearing, and one axially acting load acting in an axial direction, from output signals of the sensor units.

9. The sensor equipped wheel support bearing assembly as claimed in claim 6, wherein the load estimating unit includes a preprocessing section for calculating the average value and the amplitude value of the output signal of each of the sensors in each of the sensor units within a predetermined length of time and the estimation calculating equation in the load estimation calculating section calculates and processes the load with the use of one of only the average value and the amplitude value or with the use of both of the average value and the amplitude value.

10. The sensor equipped wheel support bearing assembly as claimed in claim 9, wherein the sensor unit includes three or more contact fixing segments and two sensors, the sensors being fitted between the neighboring first and second contact fixing segments and between the neighboring second and third contact fixing segments, and wherein the distance of spacing between the neighboring contact fixing segments or the neighboring sensors in a direction circumferentially of the stationary member is chosen to be ½+n times of a pitch of arrangement of the rolling elements, where n represents an integer, and the load estimating unit makes use of the sum of the output signals of the two sensors as an average value.

* * * * *

UNITED STATES PATENT AND TRADEMARK OFFICE
CERTIFICATE OF CORRECTION

PATENT NO.         : 9,518,609 B2
APPLICATION NO.    : 13/821772
DATED              : December 13, 2016
INVENTOR(S)        : Ayumi Akiyama et al.

Page 1 of 1

It is certified that error appears in the above-identified patent and that said Letters Patent is hereby corrected as shown below:

In the Specification

Column 1, Line 7:
Delete "2011and" and insert -- 2011 and --, therefor.

Column 1, Line 10:
Delete "2010 -251413" and insert -- 2010-251413 --, therefor.

In the Claims

Column 26, Line 12, Claim 5:
After "to" insert -- be --, therefor.

Signed and Sealed this
Fourth Day of April, 2017

Michelle K. Lee
*Director of the United States Patent and Trademark Office*